US010428259B2

(12) United States Patent
Goel et al.

(10) Patent No.: US 10,428,259 B2
(45) Date of Patent: Oct. 1, 2019

(54) DOWNHOLE FLUIDS AND METHODS OF USE THEREOF

(71) Applicant: Halliburton Energy Services, Inc., Houston, TX (US)

(72) Inventors: Vivek S. Goel, Humble, TX (US); Peter James Boul, Houston, TX (US); Xueyu Pang, Houston, TX (US); Lee J. Hall, The Woodlands, TX (US); Jay P. Deville, Spring, TX (US); Samuel J. Lewis, Duncan, OK (US); B. Raghava Reddy, Pearland, TX (US); Trissa Joseph, Kingwood, TX (US); Xiangnan Ye, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 23 days.

(21) Appl. No.: 15/554,231

(22) PCT Filed: Apr. 10, 2015

(86) PCT No.: PCT/US2015/025282
§ 371 (c)(1),
(2) Date: Aug. 29, 2017

(87) PCT Pub. No.: WO2016/164037
PCT Pub. Date: Oct. 13, 2016

(65) Prior Publication Data
US 2018/0037795 A1 Feb. 8, 2018

(51) Int. Cl.
*C09K 8/20* (2006.01)
*C09K 8/467* (2006.01)
(Continued)

(52) U.S. Cl.
CPC .......... *C09K 8/206* (2013.01); *C04B 22/0093* (2013.01); *C04B 22/10* (2013.01);
(Continued)

(58) Field of Classification Search
CPC ... C04B 2103/46; C04B 24/383; C04B 28/02; C04B 14/10; C04B 20/002;
(Continued)

(56) References Cited

U.S. PATENT DOCUMENTS 3,852,200 A * 12/1974 Meyer ................... E21B 7/18
175/65
4,629,575 A 12/1986 Weibel
(Continued)

FOREIGN PATENT DOCUMENTS

CA 2231901 2/2004
CA 2231902 11/2004
(Continued)

OTHER PUBLICATIONS

"Palygorskite", Encyclopedia Britannica, Encyclopedia Britannica, Inc., retrieved from the Internet Jan. 30, 2019 at https://britannica.com/science/palygorskite.*
(Continued)

*Primary Examiner* — Frances Tischler
(74) *Attorney, Agent, or Firm* — Baker Botts L.L.P.

(57) ABSTRACT

The present disclosure relates to downhole fluid additives including a clay, a hydroxylated polymer, a cation, and water. The disclosure further relates to downhole fluids, including drilling fluids, spaces, cements, and proppant delivery fluids containing such as downhole fluid additive and methods of using such fluids. The downhole fluid additive may have any of a variety of functions in the
(Continued)

downhole fluid and may confer any of a variety of properties upon it, such as salt tolerance or desired viscosities even at high downhole temperatures.

15 Claims, 21 Drawing Sheets

(51) Int. Cl.
| | |
|---|---|
| C04B 28/02 | (2006.01) |
| C04B 22/00 | (2006.01) |
| C04B 22/10 | (2006.01) |
| C04B 24/38 | (2006.01) |
| C04B 28/04 | (2006.01) |
| C09K 8/14 | (2006.01) |
| C09K 8/16 | (2006.01) |
| C09K 8/40 | (2006.01) |
| C09K 8/487 | (2006.01) |
| C09K 8/493 | (2006.01) |
| C09K 8/54 | (2006.01) |
| C09K 8/80 | (2006.01) |
| C09K 8/504 | (2006.01) |
| C04B 103/46 | (2006.01) |

(52) U.S. Cl.
CPC ............ *C04B 24/383* (2013.01); *C04B 28/02* (2013.01); *C04B 28/04* (2013.01); *C09K 8/145* (2013.01); *C09K 8/16* (2013.01); *C09K 8/40* (2013.01); *C09K 8/467* (2013.01); *C09K 8/487* (2013.01); *C09K 8/493* (2013.01); *C09K 8/54* (2013.01); *C09K 8/80* (2013.01); *C04B 2103/46* (2013.01); *C09K 8/504* (2013.01); *C09K 2208/10* (2013.01); *C09K 2208/32* (2013.01); *C09K 2208/34* (2013.01)

(58) Field of Classification Search
CPC .......... C04B 20/008; C04B 2103/0079; C04B 2103/12; C04B 2103/22; C04B 2103/40; C04B 2103/408; C04B 2103/50; C04B 2103/61; C04B 22/0026; C04B 38/02; C04B 38/10; C04B 22/0093; C04B 22/10; C04B 28/04; C09K 2208/10; C09K 2208/32; C09K 2208/34; C09K 8/145; C09K 8/16; C09K 8/206; C09K 8/40; C09K 8/467; C09K 8/487; C09K 8/493; C09K 8/504; C09K 8/54; C09K 8/80
See application file for complete search history.

(56) References Cited

U.S. PATENT DOCUMENTS

| | | | |
|---|---|---|---|
| 4,646,834 | A | 3/1987 | Bannister |
| 4,972,007 | A | 11/1990 | Herzog et al. |
| 5,179,076 | A | 1/1993 | Elward-Berry |
| 5,244,877 | A | 9/1993 | Elward-Berry |
| 5,447,197 | A | 9/1995 | Rae et al. |
| 5,711,383 | A | 1/1998 | Terry et al. |
| 7,101,829 | B2 | 9/2006 | Guichard et al. |
| 2002/0162486 | A1 | 11/2002 | Vijn et al. |
| 2009/0054269 | A1 | 2/2009 | Chatterji et al. |
| 2013/0126243 | A1 | 5/2013 | Smith |
| 2013/0178539 | A1 | 7/2013 | Bakeev et al. |
| 2013/0274149 | A1 | 10/2013 | Lafitte et al. |

FOREIGN PATENT DOCUMENTS

| | | |
|---|---|---|
| CA | 2231904 | 12/2004 |
| EP | 770660 | 5/1997 |
| WO | 1997/048655 | 12/1997 |
| WO | 2006/014717 | 2/2006 |
| WO | 2009/047480 | 4/2009 |
| WO | 2009/111324 | 9/2009 |
| WO | 2011/039423 | 4/2011 |
| WO | 2012/007721 | 1/2012 |
| WO | 2013/040427 | 9/2012 |
| WO | 2012/143617 | 10/2012 |
| WO | 2013/154926 | 10/2013 |

OTHER PUBLICATIONS

International Search Report and Written Opinion for PCT Patent Application No. PCT/US2056/025282, dated Mar. 15, 2017; 14 pages, Jan. 8, 2016.
Office Action for Australian Patent Application No. 2015390256, dated Feb. 12, 2018; 8 pages.
Li et al., "Cellulose Nanoparticles as Modifiers for Rheology and Fluid Loss in Bentonite Water-based Fluids", ACS Applied Materials & Interfaces, 2015, vol. 7, pp. 5006-5016; 11 pages.
Office Action for Australian Patent Application No. 2015390256, dated Jul. 3, 2018; 9 pages.
Office Action for Canadian Patent Application No. 2978540, dated Jul. 18, 2018; 4 pages.

* cited by examiner

DOWNHOLE FLUIDS AND METHODS OF USE THEREOF

RELATED APPLICATIONS

This application is a U.S. National Stage Application of International Application No. PCT/US2015/025282 filed Apr. 10, 2015, which designates the United States, and is incorporated herein by reference in its entirety.

TECHNICAL FIELD

The present disclosure relates to downhole fluid additives, downhole fluids containing such additives, and systems and methods for using such additives and downhole fluids.

BACKGROUND

Natural resources, such as oil or gas, residing in a subterranean formation can be recovered by drilling a wellbore that penetrates the formation. A variety of fluids are used in both drilling and completing the wellbore and in resource recovery. Example fluids include drilling fluid, also called mud, that is pumped into the wellbore during drilling and similar operations, spacer, which helps flush residual drilling fluid from the wellbore, cement, which typically lines at least part of the finished wellbore and is placed after flushing with a spacer, and fracturing fluids, which may be used to enhance oil or natural gas recovery. Although some parts of the wellbore lie near the surface, the majority of it is deep underground, where harsh conditions are found. In addition, any problems with a downhole fluid can be difficult to detect or correct because the fluid may be far away from the surface and relatively inaccessible, particularly in the case of cement that has set and is no longer a fluid. Accordingly, downhole fluids and additives for downhole fluids should be able to tolerate harsh conditions or avoid or ameliorate problems that may develop in downhole fluids.

BRIEF DESCRIPTION OF THE DRAWINGS

The appended drawings illustrate certain aspects of the disclosure—they are not exhaustive and are not intended to limit the scope of the present disclosure.

DETAILED DESCRIPTION

Figure 1:
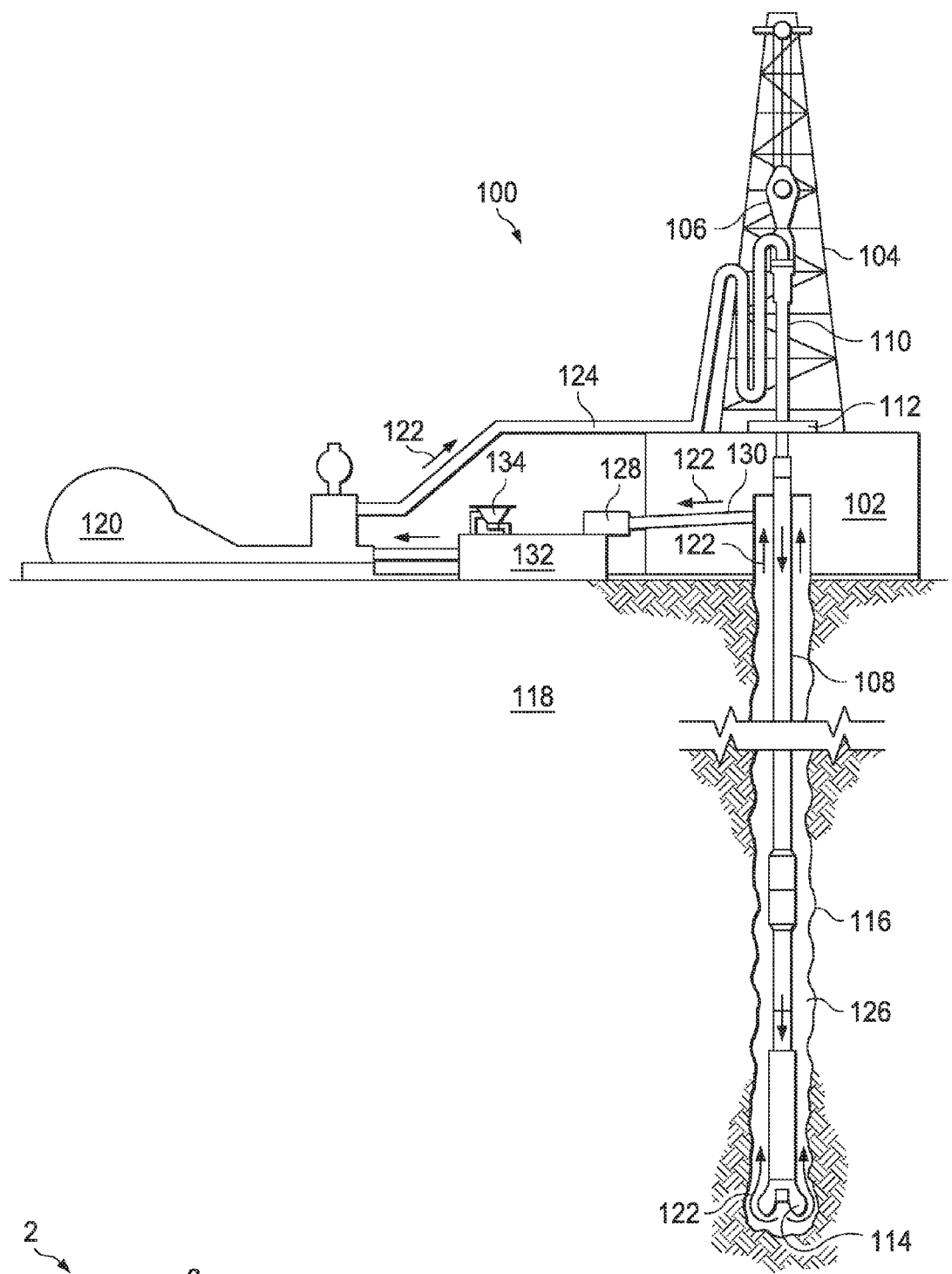
FIG. 1 is an example of a system where drilling fluid may be used.

The present disclosure relates to downhole fluid additives as well as downhole fluids containing such additives and methods for use of both. The additives and downhole fluids may be thermally stable, have desired rheological properties, or be more environmentally friendly than other alternatives. Downhole additives may also be referred to by specific use, e.g. drilling fluid additive, spacer additive, cement additive, or proppant delivery fluid additive in portions of this specification.

Downhole Fluid Additives

Downhole fluid additives according to the present disclosure contain a clay, a hydroxylated polymer, and a cation. These may be present in a variety of proportions depending on the desired viscosity of the downhole fluid and its other components. The downhole fluid additive may have an alkaline pH before or after addition to a downhole fluid, or when it encounters certain conditions downhole, such that the clay will exfoliate. For example, the pH may be at least 9 or between 10 and 12.

The clay used herein may be a phyllosilicate clay. Phyllosilicate clays tend to form parallel sheets of silicate tetrahedra with $Si_2O_5$ or another approximately 2:Si:O ratio. Phyllosilicate clays include a water or hydroxyl group.

Phyllosilicate clays suitable for use herein include smectitie clays, sepiolite clays, and palygorskite clays. Any phyllosilicate clay or any other type of clay, particularly other silicon-based clays, able to adopt a shaped or layered structure, particularly a shaped or layered structure that is between 1 nm and 999 nm in one dimension, and that is able to interact with hydroxyl groups on the hydroxylated polymer when used in a composition described herein may be suitable for use. Clays for use herein may include both clays that swell in water, and clays that do not.

Smectite clays include dioctahedral minerals and trioctahedral minerals. Smectite clays typically include layers, each having of two inward-pointing tetrahedral sheets with a central alumina octahedral sheet. The layers are typically continuous in the a and b directions, but the bonds between layers are weak and have excellent cleavage, allowing water and other molecules to enter between the layers causing expansion in the c direction. Smectite claims include montmorillonite clays, biedellite clays, hectorite clays, and saponite clays.

Montmorillonite clays typically have a general formula of $(Na,Ca)_{0.33}(Al,Mg)_2Si_4O_{10}(OH)_2 \cdot nH_2O$. Montmorillonite clays typically have greater than 50% octahedral charge. Montomorillonite clays include bentonite clays, which are formed from mixtures of montmorillonite clays and other clays or minerals.

Biedellite clays typically have a general formula of $Na_{0.5}Al_2(Si_{3.5}Al_{0.5})O_{10}(OH)_2 \cdot n(H_2O)$. Montmorillonite clays typically have greater than 50% tetrahedral charge originating from isomorphous substitution of Al for Si in the quartz sheet.

A hectorite clay have the general formula $Na^+_x[(Si_4 Mg_{y-q}Li_q)O_{10}(OH)_2]_z$, wherein $0.3 \leq x \leq 0.4$, $0 < y-q \leq 3$, $0 < q < 3$, and $0.3 \leq z \leq 1$. The hectorite clay may be colloidal. For example, the clay may be a hydrous lithium magnesium silicate, such as LAPONITE® (BYK ADDITIVES, LIMITED), which has a general chemical formula of $Na^+_{0.7}[(Si_8Mg_{5.5}Li_{0.3})O_{20}(OH)_4]^-_{0.7}$ and is formed from colloidal layered silicate sheets. Mixtures of more than one type of clay may be used.

A saponite clay may have the general formula $Ca_{0.25}(Mg,Fe)_3((Si,Al)_4O_{10})(OH)_2 \cdot n(H_2O)$. A saponite clay may a trioctahedral structure.

A sepiolite clay may have the general formula $Mg_4Si_6O_{15}(OH)_2 \cdot 6H_2O$. Sepiolite clays are typically found in fibrous, fine-particulate, and solid forms. Solid forms may be mechanically or chemically manipulated to form fibrous or particulate forms in compositions of the present disclosure.

A palygorskite clay may have the general formula $(Mg,Al)_2Si_4O_{10}(OH) \cdot 4(H_2O)$. Palygorskite clays are sometimes referred to as attapulgite, but, as used herein, attapulgite reefers to a composite of a smectite clay and a palygorskite clay. Attapulgite is also a suitable clay for use in compositions of the present disclosure.

The hydroxylated polymer may include any polymer with at least one free hydroxyl ($OH^-$) group (referred to herein simply as a hydroxyl group) per at least one component monomer. The polymers may be made of only one type of monomer, or of two or more types of monomers. For polymers made of two or more types of monomers, only one monomer type may contain a hydroxyl group, more than one monomer type may contain a hydroxyl group, or all monomer types may contain a hydroxyl group. Monomer types containing a hydroxyl group may contain only one hydroxyl group per monomer, or two or more hydroxyl groups per monomer. The polymers may be branched or unbranched. The hydroxylated polymer may include mixtures of two or more types of hydroxylated polymers. Hydroxylated polymers suitable for use in the compositions described herein include derivatives of hydroxylated polymers, such as functionalized hydrozylated polymers.

The cellulose may include primarily one type of cellulose or mixtures of two or more types of cellulose. The cellulose may be between 1 nm and 999 nm in size in at least one dimension and therefore categorized as nanocellulose. The cellulose may be between 1 μm and 1000 μm in at least one dimension and therefore categorized as microcelluose. Some cellulose may be categorized as both nanocellulose and microcellulose because it has at least one dimension in both of ranges. Cellulose may also be in the form of microfibrillated cellulose (MFC), nanocrystalline cellulose (NCC), or bacterial nano-cellulose (BNC). MFC may include nanofibrils and microfibrils and nanofibrillated cellulose. MFC may be prepared by delamination of wood pulp by mechanical pressure before and/or after chemical or enzymatic treatment or by other suitable methods. MFC may typically be a cellulose fiber with a diameter between 5 nm and 60 nm and a length of several μm, such as up to 10 μm. NCC may include cellulose nanocrystals, crystallites, whiskers, and rodlike cellulose microcrystals. NCC may be prepared by acid hydrolysis of cellulose from a variety of sources, or by other suitable methods. NCC may typically be a cellulose fiber with a diameter between 5 nm and 70 nm and a length of between 100 nm and 250 nm (particularly for NCC derived from plant celluloses), or 100 nm to several μm, such as up to 10 μm, (particularly for NCC derived from celluloses of tunicates, algae, bacteria). BNC may include bacterial cellulose, microbial cellulose, and biocellulose. BNC may typically be a cellulose fiber prepared by bacterial or microbial synthesis with a diameter of between 20 nm and 100 nm. BNC may be in a nanofiber network.

The cellulose may be used to enhance the thermal stability of the downhole fluid additive. Cellulose may often be derived from renewable, natural products, making them environmentally benign, which may be significant for drilling and production operations in sensitive areas, such as the North Sea. The hydrocellulose may be pre-mixed with water for easy handling. For example, 3 parts of cellulose can be mixed with 97 parts of water to create a polymer suspension with 3% activity (activity is simply the solid content of the cellulose in water suspension).

Celluloses include derivatives of cellulose, such as functionalized cellulose.

The cation may be any cation able to associate the clay with the cellulose, which is typically a polyanion. The cation may be present in the clay or with the cellulose prior for formation of the composition or it may be added to the composition during formation, or any combination thereof. The composition may comprise multiple types of cations, such as sodium ion ($Na^+$) and another cation.

The additives may be thermally stable in downhole conditions. For example, they may be thermally stable at temperatures of 200° F. and higher, 300° F. and higher, or 400° F. and higher for at least 12 hours or even at least 24 hours. The downhole fluid additives may also be tolerant of the presence or addition of salt water.

Downhole Fluids

Downhole fluids may benefit from the addition of an additive of the type described herein. For example, the additive may render the downhole fluid thermally stable at temperatures of 200° F. and higher, 300° F. and higher, or 400° F. and higher for at least 6 hours, at least 12 hours, or at least 24 hours. The downhole fluids may also be tolerant of the presence or addition of salt water.

Specifically, the additives may be used in drilling fluids, spacers, cements, and proppant delivery fluids, with some common and some differing effects based on the type of fluid.

The downhole fluid may contain a variety of components and additives, such as density control additives, for example barite ($BaSO_4$) particles.

Drilling Fluids

Drilling fluids are used during the drilling of wellbores. The drilling fluid may serve many purposes, including cooling the drill bit, lubricating the rotating drill string to prevent it from sticking to the walls of the wellbore, preventing blowouts by serving as a hydrostatic head to the entrance into the wellbore of formation fluids, and removing drill cuttings from the wellbore. Typically the drilling fluid is circulated downward through a drill pipe and drill bit and then moves upward through the wellbore towards the surface. Other circulation pathways are possible, however.

A drilling fluid compatible with the downhole fluid additives described herein may include a base fluid and other materials, including an additive as described herein, a bridging material, a lost circulation prevention material, a rheology modifier, such as a viscosifier, a thinner, or a low-end rheology modifier, which may increase viscosity at low shear rates, a fluid loss prevention agent, a corrosion inhibitor, a defoamer, a shale stabilizer, a lubricant, and/or other additives.

Base fluids suitable for use in a drilling fluid according to the present disclosure include a variety of fluids, including aqueous-based fluids.

Generally, the base fluid may be present in an amount sufficient to form a pumpable drilling fluid. By way of example, the base fluid may be present in the drilling fluid in an amount in the range of from 20% to 99.99% by volume of the drilling fluid. One of ordinary skill in the art, with the benefit of this disclosure, will recognize the appropriate amount and type of base fluid to include with the drilling fluids of the present disclosure in order to provide a drilling fluid for a particular application.

The bridging material, if present, may include calcium carbonate, BARACARB® (Halliburton Energy Services, Inc.) size-ground marble, N-SEAL™ (Halliburton Energy Services, Inc.) extrusion spun mineral fiber or similar materials. One of ordinary skill in the art, with the benefit of this disclosure, will recognize the appropriate amount and type of bridging material to include with the drilling fluids of the present disclosure in order to provide a drilling fluid for a particular application.

The lost circulation material, if present, may include materials that are capable of reducing the amount of drilling fluid that is lost during the drilling process. The lost circulation material may be present in the drilling fluid in an amount sufficient for a particular application. For example, the lost circulation material may be included in the drilling fluid in an amount of about 1 pound per barrel to 200 pounds per barrel. One of ordinary skill in the art, with the benefit of this disclosure, will recognize the appropriate amount of lost circulation material to include with the drilling fluids of the present disclosure in order to provide a drilling fluid for a particular application.

The viscosifier, if present, may be any agent that increases the viscosity of the drilling fluid. The viscosifier may be used in the drilling fluid to impart a sufficient carrying capacity and/or thixoropy to the drilling fluid, enabling the drilling fluid to transport drill cuttings and/or weighting materials, and/or prevent the undesired settling of drilling cuttings and/or weighting materials. Suitable viscosifiers include biopolymers (e.g. xanthan, such as Barazan® (Halliburton, Inc., Texas) and succinoglycan), cellulose, cellulose derivatives (e.g. hydroxyethylcellulose, methyl cellulose, and polyanionic cellulose), guar, and guar derivatives (e.g. hydroxypropyl guar). Combinations of viscosifiers are also suitable. The particular viscosifier suitable for a drilling fluid depends on a number of factors, including the viscosity desired, chemical compatibility with other fluids used in the formation of the wellbore, and other wellbore design concerns. One of ordinary skill in the art, with the benefit of this disclosure, will recognize the appropriate amount and type of viscosifier to include with the drilling fluids of the present disclosure in order to provide a drilling fluid for a particular application.

Other additives, if present, may include thinners, emulsifiers, wetting agents, dispersing agents, shale inhibitors, pH-control agents, filtration-control agents, alkalinity sources such as lime and calcium hydroxide, salts, or combinations thereof. One of ordinary skill in the art, with the benefit of this disclosure, will recognize the appropriate amount and type of other additives to include with the drilling fluids of the present disclosure in order to provide a drilling fluid for a particular application.

In addition, the presence of salt in water used to form the drilling fluid or encountered during use of the drilling fluid does not harm stability of drilling fluid. This allows salt water to be used to mix a drilling fluid additive or drilling fluid containing the additive. It also increases tolerance of drilling fluid for salt water or salt deposits encountered by drilling fluid during drilling.

Additionally, the drilling fluid additive may function as a loss circulation prevention additive, particularly if cellulose with a high aspect ratio is used. Loss circulation occurs when drilling fluid enters the formation and may have a variety of negative effects.

The drilling fluid may have a viscosity at surface temperature and pressure sufficient to allow it to suspend any particles additives, such as barite, while still allowing it to be pumped downhole. In the wellbore, the drilling fluid may maintain a viscosity sufficient to allow it to suspend any particle additives, while still allowing it to circulate through and out of the wellbore. The drilling fluid may further maintain a viscosity upon return to surface pressure or temperature sufficient to allow it to exit the wellbore. The drilling fluid may also further maintain its viscosity to allow it to continue to suspend any particles additives, such as barite, until it reaches a holding tank, through any cleaning or testing process, or until it is returned to the wellbore, as applicable.

Downhole fluid additives may be formed separate from the drilling fluid and added later, or formed with the drilling fluid or a component thereof. The clay and active cellulose portions of the downhole fluid additive may form only a small portion of the drilling fluid, such as between 1% and 3% by weight of water (bwow), or less than 10% bwow.

Drilling fluid additives are further described in Examples 1 and 2 below, elements of which may be combined with each other and elements of the drilling fluid, downhole fluid, and downhole fluid additive as described above and with method of using a drilling fluid as described below.

Spacers

Spacers, also sometimes referred to as displacement fluids, wash fluids, or inverter fluids, are placed in the wellbore after drilling and before cementing. Spacers prepare the wellbore to receive cement. For instance, a spacer may fully displace drilling fluid from the wellbore annulus and/or condition the casing and wellbore surface to bond with cement. Drilling fluid can contaminate the cement, which can eventually lead to issues such as incompatibility, poor bonding as well as suppression of compressive strength development. The presence of drilling fluid filter cake over the casing may affect the bonding between the casing and cement and lead to formation of micro channels. Accordingly, spacers often remove any cakes from the drilling fluid and leave the casing and annulus water-wet to receive cement.

To be effective, the spacer can have certain characteristics. For example, the spacer may be compatible with the displaced fluid and the cement. This compatibility may also be present at downhole temperatures and pressures. In some instances, it is also desirable for the spacer to leave surfaces in the well bore water wet, thus facilitating bonding with the cement. Rheology of the spacer can also be important. A number of different rheological properties may be important in the design of a spacer, including yield point, plastic viscosity, gel strength, and shear stress, among others. While rheology can be important in spacer design, conventional spacers may not have the desired rheology at downhole temperatures. For instance, conventional spacers may experience undesired thermal thinning at elevated temperatures.

As a result, conventional spacers may not provide the desired displacement in some instances or lead to poor suspensions in other instances.

Water-based spacers contain a base fluid which may be water-based or even water, including salt water. One of ordinary skill in the art, with the benefit of this disclosure, will recognize the appropriate amount and type of base fluid to include in the spacers of the present disclosure in order to provide a spacer for a particular application.

Spacers may also contain additives, such as surfactants, defoamers, salts, viscosifiers, and other additives.

A surfactant may be used in a spacer to enhance the compatibility between the spacer and oil-based drilling fluid. A surfactant may also help to change the interface between the mud and spacer from an oil-external emulsion to a water-external emulsion. In the past, a surfactant package containing DSS-A (oil soluble), DSS-B (water soluble), and SEM-8 (water soluble) has been used extensively. Surfactants may be salt-tolerant. Defoamers may also be included in a spacer when it contains a surfactant. One of ordinary skill in the art, with the benefit of this disclosure, will recognize the appropriate amount and type of surfactant and/or defoamer to include in the spacers of the present disclosure in order to provide a spacer for a particular application.

Spacers are often formed with water, including seawater. For various reasons, in either instance, inorganic salts such as NaCl or $CaCl_2$ may be added. If salts are added or seawater is used, then typically the surfactant, if present, will be compatible for use with seawater or having other inorganic salts dissolved in the water. One of ordinary skill in the art, with the benefit of this disclosure, will recognize the appropriate amount and type of salts to include in the spacers of the present disclosure in order to provide a spacer for a particular application.

One of ordinary skill in the art, with the benefit of this disclosure, will recognize the appropriate amount and type of viscosifiers, and/or other additives to include in the spacers of the present disclosure in order to provide a spacer for a particular application.

In addition, the presence of salt in water used to form the spacer or encountered during use of the spacer does not harm the stability of spacer. This allows salt water to be used to mix a spacer additive or spacer containing the additive. It also increases tolerance of spacer for salt water or salt deposits encountered by spacer during use.

Additionally, the spacer additive may function as a lost circulation additive. Lost circulation occurs when spacer enters the formation and may have a variety of negative effects.

The spacer may have a viscosity at surface temperature and pressure sufficient to allow it to suspend any particles additives, such as barite, while still allowing it to be pumped downhole. In the wellbore, the spacer may maintain a viscosity sufficient to allow it to suspend any particle additives, while still allowing it to circulate through and out of the wellbore. The spacer may further maintain a viscosity upon return to surface pressure or temperature sufficient to allow it to exit the wellbore. The spacer may also further maintain its viscosity to allow it to continue to suspend any particles additives, such as barite, until it reaches a holding tank, through any cleaning or testing process, or until it is returned to the wellbore, as applicable.

Downhole fluid additives may be formed separate from the spacer and added later, or formed with the spacer or a component thereof. The clay and active cellulose portions of the downhole fluid additive may form only a small portion of the spacer, such as between 1% and 3% bwow, or less than 10% bwow.

Spacer additives are further described in Examples 3 and 4 below, elements of which may be combined with elements of the spacer, downhole fluid, and downhole fluid additive as described above and with method of using a spacer as described below.

Cements

A wellbore may be lined with cement for a variety of purposes. Cement is typically placed between the wellbore wall which is made up of the formation, and a casing. The cement may secure, protect, and/or support the casing in the wellbore. Cement is typically introduced into an annulus between the wellbore wall and the casing, then allowed to set. Cement may help prevent the influx of undesirable materials into the wellbore or the migration of gases or fluids within the annulus. Fluid migration control may be particularly important in directing the flow of oil or gas through the casing. Typically, in order to achieve these and other desirable effects, the cement fills the annulus and bonds to the casing and the wellbore wall. As explained above, drilling fluid may interfere with cementing, so a spacer is typically placed in the area to be cemented prior to introduction of the cement. Cements can also be used in well-plugging or gravel-packing operations.

Cement may refer to a wet mixture, or a set cement, or both, as will be apparent from context. A set cement is typically one that has become solid or hard. For example, a set cement may have been solidified or cured for up to 72 hours. A set cement may also have a compressive strength of greater than 50 psi.

A cement may include a cement base and water, in addition to other materials such as a downhole fluid additive as described herein.

Cement base may include any powder substance that acts as a binder to bind other materials together. It may include any of a variety of hydraulic cements suitable for use in subterranean cementing operations. Examples include hydraulic cements that comprise calcium, aluminum, silicon, oxygen, and/or sulfur, and which set and harden by reaction with water. Such hydraulic cements, include, but are not limited to, Portland cements, pozzolan cements, gypsum cements, high-alumina-content cements, slag cements, silica cements, and combinations thereof. The hydraulic cement may include a Portland cement. The Portland cement may be classified as Class A, C, H, or G cement according to the American Petroleum Institute, *API Specification for Materials and Testing for Well Cements*, API Specification 10, Fifth Ed., Jul. 1, 1990. In addition, the hydraulic cement may include cements classified as ASTM Type I, II, or III.

Water used in cement may include any water compatible with the cement base. The water may be freshwater, brackish water, or saltwater, or any combination thereof in any proportion. The amount of water may be adjusted to obtain the desired rheology. One of ordinary skill in the art, with the benefit of this disclosure, will recognize the appropriate amount and type of water to include in the cements of the present disclosure in order to provide a cement for a particular application.

The cement may also include salt, such as sodium chloride, calcium chloride, calcium bromide, potassium chloride, potassium bromide, magnesium chloride, or any combination thereof in any proportion. The salt may be in a concentration in the range of about 0.1% to about 40% by weight of water (bwow). One of ordinary skill in the art, with the benefit of this disclosure, will recognize the appropriate amount and type of salt to include in the cements of the present disclosure in order to provide a cement for a particular application.

The cement may further include a set retarder to help increase the thickening or setting time of the cement such that the cement remains pumpable for a desired time. The amount of set retarder added may also be selected such that the cement eventually sets, which is prevented by too much set retarder. Conventional set retarders have been used to delay the setting time of cement compositions. Examples of conventional set retarders include lignosulfates, hydroxycarboxy acids, phosphonic acid derivatives, synthetic polymers (e.g., copolymers of 2-acrylamido-2-methylpropane sulfonic acid ("AMPS")), biodegradable polymers, borate salts, and combinations thereof. The molecular weight of some polymeric set retarders may be greater than 10,000 to allow them to be effective at temperatures between 150° F. and 500° F., which are commonly encountered in wellbores. However, there are trade-offs between solubility of set retarders and molecular weight that may be taken into account in selecting the molecular weight of a given polymeric set retarder. One of ordinary skill in the art, with the benefit of this disclosure, will recognize the appropriate amount and type of set retarder to include in the cements of the present disclosure in order to provide a cement for a particular application.

The cement may also include other additives suitable for use in wellbore cementing operations such as friction-reducers, strength-retrogression additives, set accelerators, weighting agents, lightweight additives, gas-generating additives, mechanical property enhancing additives, lost-circulation materials, filtration-control additives, dispersants, fluid loss control additives, defoaming agents, foaming agents, thixotropic additives, nano-particles, and combinations thereof. One of ordinary skill in the art, with the benefit of this disclosure, will recognize the appropriate amount and type of other additives to include in the cements of the present disclosure in order to provide a cement for a particular application.

A strength-retrogression additive may include course silica flour, fine silica flour, and any combination thereof in any proportion. The strength stabilizer may be present in a concentration in the range of about 20% to about 80% by weight of the cement (bwoc). One of ordinary skill in the art, with the benefit of this disclosure, will recognize the appropriate amount and type of strength-retrogression additive to include in the cements of the present disclosure in order to provide a cement for a particular application.

A fluid loss additive may include HALAD™ products, LATEX™ 2000, LAP-1, and LAP-2, available from Halliburton Energy Services, Inc. Among the possible compositions for fluid loss additives, without limitation, are cellulose derivatives, such as hydroxyethylcellulose, polyacrylamide polymers and copolymers, copolymers of 2-Acrylamido-2-methylpropane sulfonic acid (AMPS® (Lubrizol, Corporation)) and dimethylacrylamide (DMA), polymers of acrylonitrile, acrylamide and AMPS monomers grafted on lignite, acrylomorpholine and vinylphosphonic acid copolymers, humic acid grafted polymers, and polymers of polyvinyl alcohol and boric acid. The fluid loss additive may be present in a concentration in the range of 0.1% to 4% bwoc. One of ordinary skill in the art, with the benefit of this disclosure, will recognize the appropriate amount and type of fluid loss additive to include in the cements of the present disclosure in order to provide a cement for a particular application.

A dispersant may include, without limitation, sulfonated-formaldehyde-based dispersants (e.g., sulfonated acetone formaldehyde condensate), examples of which may include CFR™-3 dispersant, available from Halliburton Energy Services, Inc. Dispersant compositions could be, but are not limited to, sulfonated acetone formaldehyde condensate, naphthalene sulfonates, naphthalene sulfonates condensed with formaldehyde, sulfonated polymers, and polycarboxylated ethers. One of ordinary skill in the art, with the benefit of this disclosure, will recognize the appropriate amount and type of dispersant to include in the cements of the present disclosure in order to provide a cement for a particular application.

A filler material may include fly ash, sand, clays, and vitrified shale. The filler material may be present in a concentration in the range of about 2% to about 50% bwoc. One of ordinary skill in the art, with the benefit of this disclosure, will recognize the appropriate amount and type of filler material to include in the cements of the present disclosure in order to provide a cement for a particular application.

Other commercially-available additives may be used to modify the fluid or solid properties of the cement to meet specific application requirements. For example, weighting agents such as hematite, hausmannite, barium sulphate, or other materials with specific gravities greater than 1 and more specifically greater than 3 can be used to modify the specific gravity of the cement for certain wells. One of ordinary skill in the art, with the benefit of this disclosure, will recognize the appropriate amount and type of commercially available other additives to include in the cements of the present disclosure in order to provide a cement for a particular application.

Downhole fluid additives may be formed separate from the cement and added later, or formed with the cement or a component thereof. The clay and active cellulose portions of the cement additive may form only a small portion of the cement, such as between 1% and 3% bwow, between 1% and 2% bwow, or less than 10% bwow. The clay and active cellulose portions of the cement additive may form a different composition bwow. One of ordinary skill in the art, with the benefit of this disclosure, will recognize the appropriate amount and type of the additives to include in the cements of the present disclosure in order to provide a cement for a particular application.

A cement containing a cement additive as disclosed herein may use the additive as a suspending aid. A suspending aid creates a desired viscosity in the cement, and prevents settling of cement particles and other particles/fibers/additives in the cement. This is desired to maintain uniform and integrity of density. The cement may have a viscosity at surface temperature and pressure sufficient to allow it to suspend any desired materials, such as cement base components, while still allowing it to be pumped downhole. In the wellbore, the cement may maintain a viscosity sufficient to allow it to suspend any desired materials until it has thickened or set, while still allowing it to circulate into the appropriate locations in the wellbore. Maintaining suspendability of particles is important in long horizontal sections where the temperature can remain at elevated conditions for long distances. In such situations, the suspending aid's ability to maintain uniform suspensions becomes all the more significant.

In addition, the presence of salt in water used to form the cement or encountered by the cement does not harm the stability of the cement. This allows salt water to be used to mix a cement additive or cement containing the additive. It also increases tolerance of cement for salt water or when passing through salt zones in the formation surrounding the wellbore. In addition, although some suspending aids may work synergistically with the cement additive to resist negative effects of salt, in many cases it is possible to otherwise omit suspending aids from the cement when using a cement additive of the present disclosure.

Cement additives of the present disclosure may also help prevent fluid loss in cement or may render it less rapid. The design properties of cement slurries are significantly influenced by the water content. Thus, slurries that lose water can also be subject to a loss or degradation of design properties. There are a number of conditions that can induce fluid loss. One common condition is water being drawn from the slurry into the permeable formation, in particular when pumping has ceased and the slurry is static, but not yet set. Another common condition is displacing or squeezing water from the slurry as it passes through constrictions, such as tight clearance between the casing and the formation, during placement in a wellbore. Fluid loss additives help retain the key characteristics of cement slurries, including viscosity, thickening time, density and compressive strength development. The additive may generate sufficient tortuosity and viscosity in a cement to prevent or greatly decrease fluid loss. This property may be particularly useful in low-density cement slurries, such as those with a density in the range of 8 pound mass per gallon (lbm/gal) to 14 lbm/gal. Cellulose amounts of 6% bwow or greater may be particularly effective in combination with clay to prevent fluid loss or to render fluid loss less rapid.

Cement additives according to this disclosure may also produce sufficient gel strength in cement slurries to function as lost circulation prevention additives. Lost circulation occurs when cement flows into the formation and can have a variety of negative effects, including impairment of production for oil and/or gas bearing formations. Cement additives can confer sufficient gel strength in cement to prevent or decrease lost circulation. This may be particularly helpful in low-density cement slurries. In particular, cements containing cement additives may have a 10-minute gel strength of at least 90-100 $lb_f/100$ $ft^2$ at 190° F. and a comparable gel strength even at 350° F.

Cement additives according to this disclosure may further have sufficient gel strength, tortuosity, and viscosity to function as gas migration control additives. Gas migration occurs when gas enters the cement. The gas may create channels in the cement, which may lead to a variety of problems. Gas migration control may provide greater cement integrity and improved zonal isolation, reduced expenses for remedial squeeze cementing, less chance of damaging tubulars in the casing, and a lower risk of downhole blowouts. Cement additives according to this disclosure may, in particular, develop a gel strength from 100 pound force per hundred square feet ($lb_f/100$ $ft^2$) to 500 $lb_f/100$ $ft^2$ in less than 30 minutes, even in less than 20 minutes.

Cement additives are further described in Examples 5 to 8 below, elements of which may be combined with elements of the cement, downhole fluid, and downhole fluid additive as described above and with method of using a cement as described below.

Proppant Delivery Fluid Additives

Proppants are solid materials, typically treated sand or man-made ceramics, designed to keep an induced hydraulic fracture open during or following a fracturing treatment. Proppants are delivered to the fracture in a proppant delivery fluid, such as a fracturing fluid, which may often be gel-, foam-, or slick-water-based. These delivery fluids are designed to have high viscosity to enable them to carry more proppants and are often linear gels. One of ordinary skill in the art, with the benefit of this disclosure, will recognize the appropriate amount and type of components to include in the proppant delivery fluids of the present disclosure in order to provide a proppant delivery fluid for a particular application.

Traditionally linear gels that contain cellulose derivatives, guar, or guar derivatives along with other chemicals are used as fracturing fluids, but these materials face stability problems at high downhole temperatures. The proppant delivery fluid additives of the present disclosure may be used to form a proppant delivery fluid that remains a linear gel at high downhole temperatures, allowing proppant delivery and/or fracturing. Proppant delivery fluids containing an additive as described herein may not contain any other viscosifiers, such as guar or guar derivatives, or may contain a smaller amount of viscosifiers.

The proppant delivery fluid may be aqueous-based fluid, including any aqueous fluid suitable for use in subterranean applications, provided that the aqueous-based fluid is compatible with the other components of the proppant delivery fluid, including the proppant. For example, the aqueous-based fluid may include water or an aqueous brine. An aqueous brine may include water and an inorganic monovalent salt, an inorganic multivalent salt, or both. The aqueous brine may be naturally occurring or artificially-created. Water present in the brine may be from any suitable source, including sea water, tap water, freshwater, produced water, or combinations thereof. The additives as disclosed herein may result in a proppant delivery fluid with increased salt tolerance as compared to similar fluids without the additives. One of ordinary skill in the art, with the benefit of this disclosure, will recognize the appropriate amount and type of water to include in the proppant delivery fluids of the present disclosure in order to provide a proppant delivery fluid for a particular application.

The proppant delivery fluid may further include additional additives as deemed appropriate for improving the properties of the fluid. Such additives may vary depending on the intended use of the fluid in the wellbore. These additives may be introduced singularly or in combination using any suitable methodology and in amounts effective to produce the desired improvements in fluid properties. One of ordinary skill in the art, with the benefit of this disclosure, will recognize the appropriate amount and type of additional additives to include in the proppant delivery fluids of the present disclosure in order to provide a proppant delivery fluid for a particular application.

Examples of proppants suitable for use in this disclosure include silica (sand), graded sand, Ottawa sands, Brady sands, Colorado sands; resin-coated sands; gravels; synthetic organic particles, nylon pellets, high density plastics, polytetrafluoroethylenes, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells (including fruit pits) of seeds of fruits, plums, peaches, cherries, apricots, and the like; ground or crushed seed shells of other plants (e.g., maize, corn cobs or corn kernels); crushed fruit pits or processed wood materials, materials derived from woods, oak, hickory, walnut, poplar, mahogany, and the like, including such woods that have been processed by grinding, chipping, or other form of particularization; or combinations thereof. The proppant may include sand.

The proppants may be of any suitable size and/or shape, for example the proppant may have an average particle size in the range of from about 2 to about 400 mesh, alternatively from about 8 to about 100 mesh, or alternatively about 10 to about 70 mesh, U.S. Sieve Series. The proppant may be present in the proppant delivery fluid in an amount of from about 0.1 pounds per gallon (ppg) to about 28 ppg, alternatively from about 0.1 ppg to about 14 ppg, or alternatively from about 0.1 ppg to about 8 ppg, based on the volume of the proppant delivery fluid.

One of ordinary skill in the art, with the benefit of this disclosure, will recognize the appropriate amount and type of a proppant to include in the proppant delivery fluids of the present disclosure in order to provide a proppant delivery fluid for a particular application.

Downhole fluid additives may be formed separate from the proppant delivery fluid and added later, or formed with the proppant delivery fluid or a component thereof. The clay and active cellulose portions of the proppant delivery fluid additive may form only a small portion of the proppant delivery fluid, such as between 1% and 3% bwow, or less than 10% bwow.

Proppant delivery fluid additives are further described in Example 9 below, elements of which may be combined with elements of the proppant delivery fluid, downhole fluid, and downhole fluid additive as described above and with method of using a proppant delivery fluid as described below.

Downhole Fluids with Additional Viscosity Control

Downhole fluids described herein, including drilling fluids, spacers, cements, and proppant delivery fluids may include additional viscosity control materials that help establish a particular viscosity or stabilize viscosity. In particular, the downhole fluids may include nano-sized (between 1 nm and 1 μm in average diameter or size in their longest dimension) silica (silicon dioxide, $SiO_2$) particles. The amount of these particles may range from between half the weight of cellulose present to double the weight of cellulose present. The silica nanoparticles may be between 4 nm and 100 nm in size, between 4 nm and 6 nm in size, between 40 nm and 60 nm in size, between 40 and 100 nm in size, less than 100 nm in size, less than 60 nm in size, or less than 6 nm in size. These sizes may refer to individual particle sizes for particles that tend to remain separate in the downhole fluid, or agglomerate, chain, or other combined particle sizes for particles that tend to form groups in the downhole fluid.

Without limiting the invention to a particular mode of action, the silica particles may act as a repulsive barrier between hydrodynamic spheres of other components of downhole fluids. This repulsive barrier may inhibit interaction between the hydrodynamic spheres of the other components. This may delay the development of viscosity as hydrodynamic spheres of other components begin to interact. It may additionally or alternatively extend the viscosity stability (demonstrated by a generally flat viscosity profile), including surface viscosity, to higher temperatures. Both of these effects are influenced by the size ratio of the hydrodynamic sphere of spheres of the other components to the hydrodynamic sphere of the nano-sized silica particles. This depends on the size of the nano-sized silica particles and the identity of the other components. The concentration of the nano-sized silica particles also influences these properties.

Using this information as well as the information contained in Example 10, one of ordinary skill in the art may determine the appropriate nano-sized silica particles as well as the appropriate amount for use with any downhole fluid described herein to achieve a given viscosity or viscosity stability.

In addition, although the above description and Example 10 focus on the use of silica nano-sized particles in downhole fluids otherwise described herein, one of ordinary skill in the art may also use this disclosure to determine appropriate nano-sized silica particles as well as the appropriate amount for use with any downhole fluid with components that form hydrodynamic spheres to achieve a given viscosity or viscosity stability. This includes downhole fluids other than those described herein, such as conventional drilling fluids, spacers, cements, or proppant delivery fluids.

Methods of Forming and Using Downhole Fluids

Drilling Methods

The exemplary drilling fluids disclosed herein may be used in drilling a wellbore. In doing so, a drill bit may be mounted on the end of a drill string that may include several sections of drill pipe. The drill bit may be used to extend the wellbore, for example, by the applications of force and torque to the drill bit. The drilling fluid may be circulated downwardly through the drill pipe, through the drill bit, and upwardly through the annulus between the drill pipe and the formation to the surface. Other methods of circulation are possible. The drilling fluid may be employed for general drilling of a wellbore in subterranean formations, for example, through non-producing zones. It may also be employed for drilling through hydrocarbon-bearing producing zones.

The drilling fluids disclosed herein may directly or indirectly affect one or more components or pieces of equipment associated with the preparation, delivery, recapture, recycling, reuse, and/or disposal of the disclosed drilling fluid. For example, the disclosed drilling fluid may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary drilling fluid. The disclosed drilling fluid may also directly or indirectly affect any transport or delivery equipment used to convey the drilling fluid to a well site or downhole such as, for example, any transport vessels, conduits, pipelines, trucks, tubulars, and/or pipes used to compositionally move the drilling fluid from one location to another, any pumps, compressors, or motors (e.g., topside or downhole) used to drive the drilling fluid into motion, any valves or related joints used to regulate the pressure or flow rate of the drilling fluid, and any sensors (i.e., pressure and temperature), gauges, and/or combinations thereof, and the like. The disclosed drilling fluid may also directly or indirectly affect the various downhole equipment and tools that may come into contact with the drilling fluid such as, but not limited to, wellbore casing, wellbore liner, completion string, insert strings, drill string, coiled tubing, slickline, wireline, drill pipe, drill collars, mud motors, downhole motors and/or pumps, spacer pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

For example, and with reference to FIG. 1, the disclosed drilling fluid may directly or indirectly affect one or more components or pieces of equipment associated with an exemplary wellbore drilling assembly 100.

As illustrated, the drilling assembly 100 may include a drilling platform 102 that supports a derrick 104 having a traveling block 106 for raising and lowering a drill string 108. The drill string 108 may include drill pipe and coiled tubing, as generally known to those skilled in the art. A kelly 110 supports the drill string 108 and is driven either by a downhole motor and/or via rotation of the drill string 108 from the well surface. As the drill bit 114 rotates, it creates a wellbore 116 that penetrates a subterranean formation 118. While wellbore 116 is shown extending generally vertically into the subterranean formation 118, the principles described herein are also applicable to wellbores that extend at an angle through the subterranean formation 118, such as horizontal and slanted wellbores.

A pump 120 (e.g. a mud pump) circulates drilling fluid 122 through a feed pipe 124 and to kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a cleaned drilling fluid 122 is deposited into a nearby retention pit 132 (e.g. a mud pit). While illustrated as being arranged at the outlet of wellbore 116 via the annulus 126, those skilled in the art will readily appreciate that the fluid processing unit(s) 128 may be arranged at any other location in the drilling assembly 100 to facilitate its proper function, without departing from the scope of the disclosure.

Materials, such as lost circulation materials, may be added to the drilling fluid, if present, via a mixing hopper 134 communicatively coupled to or otherwise in fluid communication with retention pit 132. Mixing hopper 134 may include, but is not limited to, mixers and related mixing equipment known to those skilled in the art. Materials may also be added to the drilling fluid 122 at any other location in drilling assembly 100. For example, retention pit 132 may include multiple retention pits, or retention pit 132 may include one or more fluid storage facilities where materials may be stored, reconditioned, and/or regulated until added to the drilling fluid.

As mentioned above, the drilling fluid may directly or indirectly affect the components and equipment of drilling assembly 100. For example, the drilling fluid may directly or indirectly affect the fluid processing unit(s) 128 which may include one or more of a shaker (e.g. shale shaker), a centrifuge, a hydrocyclone, a separator (including magnetic and electrical separators), a desilter, a desander, a filter (e.g. diatomaceous earth filters), a heat exchanger, or any fluid reclamation equipment. The fluid processing unit(s) 128 may further include one or more sensors, gauges, pumps, compressors, and the like used to store, monitor, regulate, and/or recondition a drilling fluid material.

The disclosed drilling fluid may directly or indirectly affect the pump 120, which representatively includes any conduits, pipelines, trucks, tubulars, and/or pipes used to fluidically convey the drilling fluid downhole, any pumps, compressors, or motors (e.g. at the surface or downhole) used to drive the drilling fluid into motion, and valves or related joints used to regulate the pressure or flow rate of the drilling fluid, and any sensors (e.g. pressure, temperature, flow rate, etc.) gauges, and/or combinations thereof, and the like. The disclosed drilling fluid may also directly or indirectly affect any mixing hopper 134 and any retention pit 123 and their assorted variations.

The disclosed drilling fluid may also directly or indirectly affect the various downhole equipment and tools that may come into contact with the drilling fluid, such as the drill string 108, any floats, drill collars, mud motors, downhole motors and/or pumps associated with the drill string 108, and any measuring while drilling (MWD) or logging while drilling (LWD) tools and related telemetry equipment, sensors, or distributed sensors associated with the drill string 108. The disclosed drilling fluid may also directly or indirectly affect any downhole heat exchangers (which may be reduced in number or unnecessary), valves and corresponding actuation devices, tool seals, packers, and other wellbore isolation devices or components, and the like associated with wellbore 116. The disclosed drilling fluid may also directly or indirectly affect the drill bit 114, which may include roller cone bits, fixed-cutter bits, and any hole openers, reamers, or coring bits.

It should be noted that, while FIG. 1 generally depicts a land-based drilling assembly, those skilled in the art would readily recognize that the principles described herein are equally applicable to subsea drilling operations that employ floating or sea-based platforms and rigs, without departing from the scope of the disclosure.

Spacing Methods

The exemplary spacers disclosed herein may directly or indirectly affect one or more components or pieces of equipment associated with the preparation, delivery, recapture, reuse, recycling, and/or disposal of the disclosed spacer. For example, the disclosed spacer may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary spacer. The disclosed spacer may also directly or indirectly affect any transport or delivery equipment used to convey the spacer to a well site or downhole such as, for example, any transport vessels, conduits, pipelines, trucks, tubulars, and/or pipes used to compositionally move the spacer from one location to another, any pumps, compressors, or motors (e.g., topside or downhole) used to drive the spacer into motion, any valves or related joints used to regulate the pressure or flow rate of the spacer, and any sensors (i.e., pressure and temperature), gauges, and/or combinations thereof, and the like. The disclosed spacer may also directly or indirectly affect the various downhole equipment and tools that may come into contact with the spacer such as, but not limited to, wellbore casing, wellbore liner, completion string, insert strings, drill string, coiled tubing, slickline, wireline, drill pipe, drill collars, mud motors, downhole motors and/or pumps, spacer pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Figure 2:
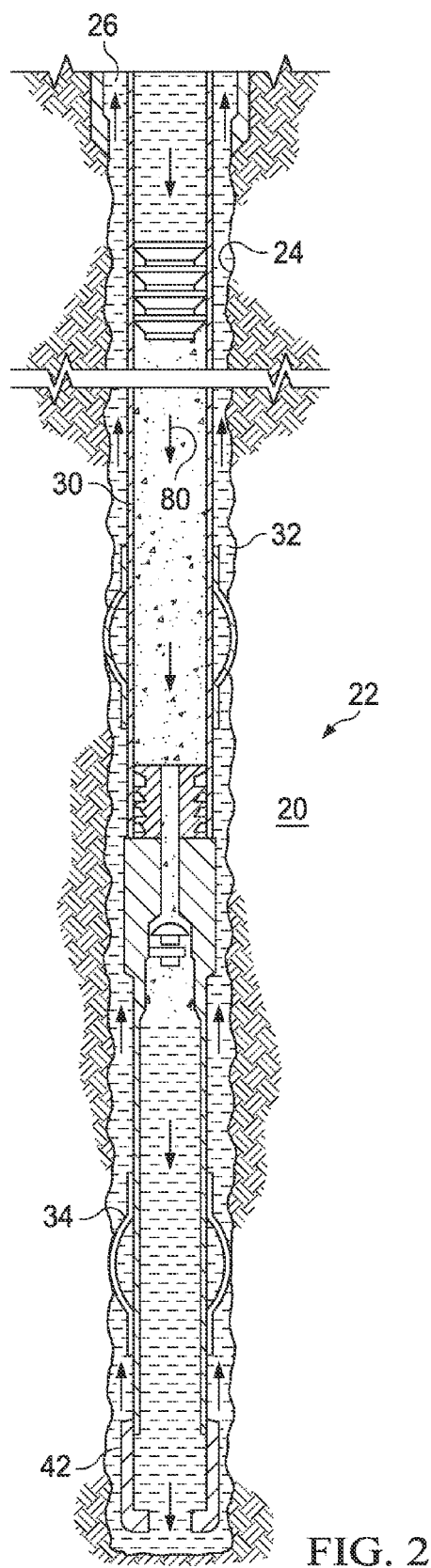
FIG. 2 illustrates placement of a spacer into a wellbore annulus.

Turning now to FIG. 2, the spacer 80 may be used to flush drilling fluid from a subterranean formation 20. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. As illustrated, a surface casing 28 has been inserted into the wellbore 22. The surface casing 30 may later be cemented to the walls 24 of the wellbore 22 by cement sheath 26. Further as illustrated, one or more additional conduits (e.g., intermediate casing, production casing, liners, etc.) shown here as casing 30 may also be disposed in the wellbore 22. As illustrated, there is a wellbore annulus 32 formed between the casing 30 and the walls 24 of the wellbore 22 and/or the surface casing 28. One or more centralizers 34 may be attached to the casing 30, for example, to centralize the casing 30 in the wellbore 22 prior to and after flushing of the drilling fluid with the spacer.

With continued reference to FIG. 2, the spacer 80 may be pumped down the interior of the casing 30. The spacer 80 may be allowed to flow down the interior of the casing 30 through the casing shoe 42 at the bottom of the casing 30 and up around the casing 30 into the wellbore annulus 32. While not illustrated, other techniques may also be utilized for introduction of the spacer 80. By way of example, reverse circulation techniques may be used that include introducing the spacer 80 into the subterranean formation 20 by way of the wellbore annulus 32 instead of through the casing 30.

Spacer 80 may fully displace any drilling fluid remaining in wellbore 22. Spacer 80 may itself be displaced when a cement is introduced into wellbore 22. At least a portion of spacer 80 may exit the wellbore annulus 32 via a flow line 38 and be deposited, for example, in one or more retention pits 40 as shown on FIG. 4.

It should be noted that, while FIG. 4 generally depicts a land-based drilling assembly, those skilled in the art would readily recognize that the principles described herein are equally applicable to subsea drilling operations that employ floating or sea-based platforms and rigs, without departing from the scope of the disclosure.

Cementing Methods

The exemplary cements disclosed herein may directly or indirectly affect one or more components or pieces of equipment associated with the preparation, delivery, recapture, reuse, recycling, and/or disposal of the disclosed cement. For example, the disclosed cement may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary cement. The disclosed cement may also directly or indirectly affect any transport or delivery equipment used to convey the cement to a well site or downhole such as, for example, any transport vessels, conduits, pipelines, trucks, tubulars, and/or pipes used to compositionally move the cement from one location to another, any pumps, compressors, or motors (e.g., topside or downhole) used to drive the cement into motion, any valves or related joints used to regulate the pressure or flow rate of the cement, and any sensors (i.e., pressure and temperature), gauges, and/or combinations thereof, and the like. The disclosed cement may also directly or indirectly affect the various downhole equipment and tools that may come into contact with the cement such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Figure 3:
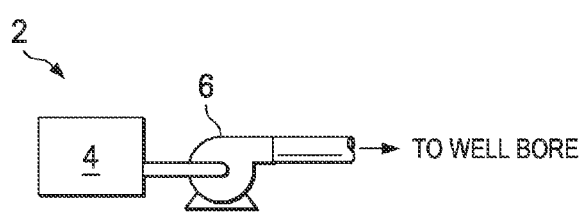
FIG. 3 is a system for preparation and delivery of a cement to a wellbore.

Referring now to FIG. 3, an example system that may be used in the preparation of a cement will now be described. FIG. 3 illustrates a system 2 for preparation of a cement and delivery to a wellbore. As shown, the cement may be mixed in mixing equipment 4, such as a jet mixer, re-circulating mixer, or a batch mixer, for example, and then pumped via pumping equipment 6 to the wellbore. The mixing equipment 4 and the pumping equipment 6 may be disposed on one or more cement trucks as will be apparent to those of ordinary skill in the art. A jet mixer may be used, for example, to continuously mix the composition, including water, as it is being pumped to the wellbore.

An example technique and system for placing a cement into a subterranean formation will now be described with reference to FIG. 4A and FIG. 4B. FIG. 4A illustrates surface equipment 10 that may be used in placement of a cement. It should be noted that while FIG. 4A generally depicts a land-based operation, those skilled in the art will readily recognize that the principles described herein are equally applicable to subsea operations that employ floating or sea-based platforms and rigs, without departing from the scope of the disclosure. As illustrated by FIG. 4A, the surface equipment 10 may include a cementing unit 12, which may include one or more cement trucks. The cementing unit 12 may include mixing equipment 4 and pumping equipment 6 (e.g., FIG. 3) as will be apparent to those of ordinary skill in the art. The cementing unit 12 may pump a cement 14 through a feed pipe 16 and to a cementing head 18 which conveys the cement 14 downhole.

Figure 4B:
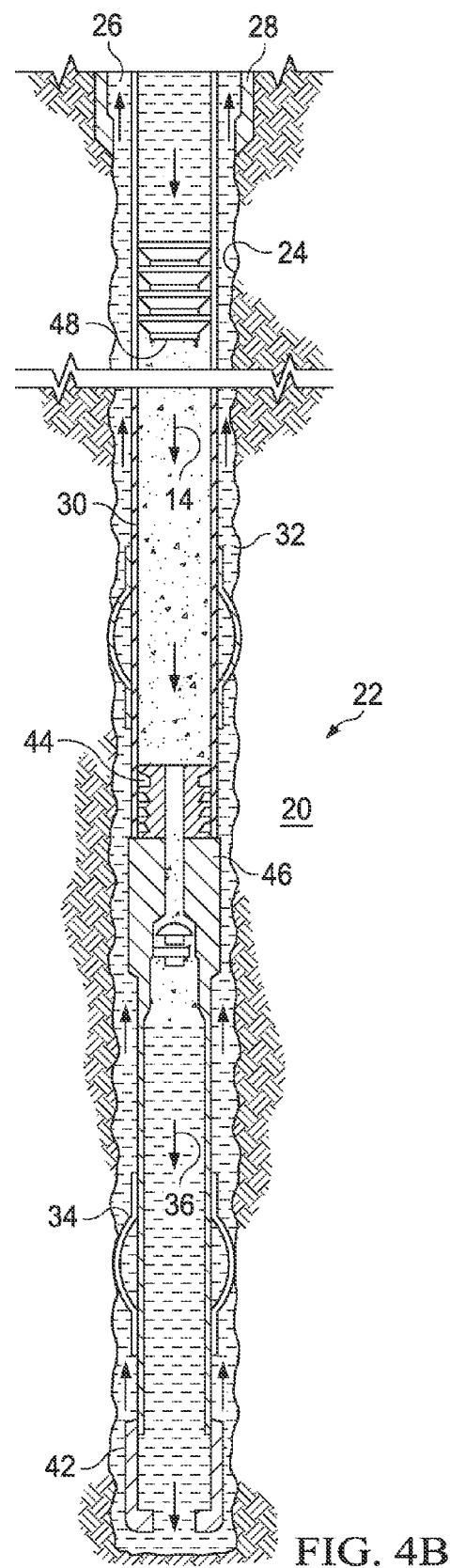
FIG. 4B illustrates placement of cement into a wellbore annulus.
Figure 4A:
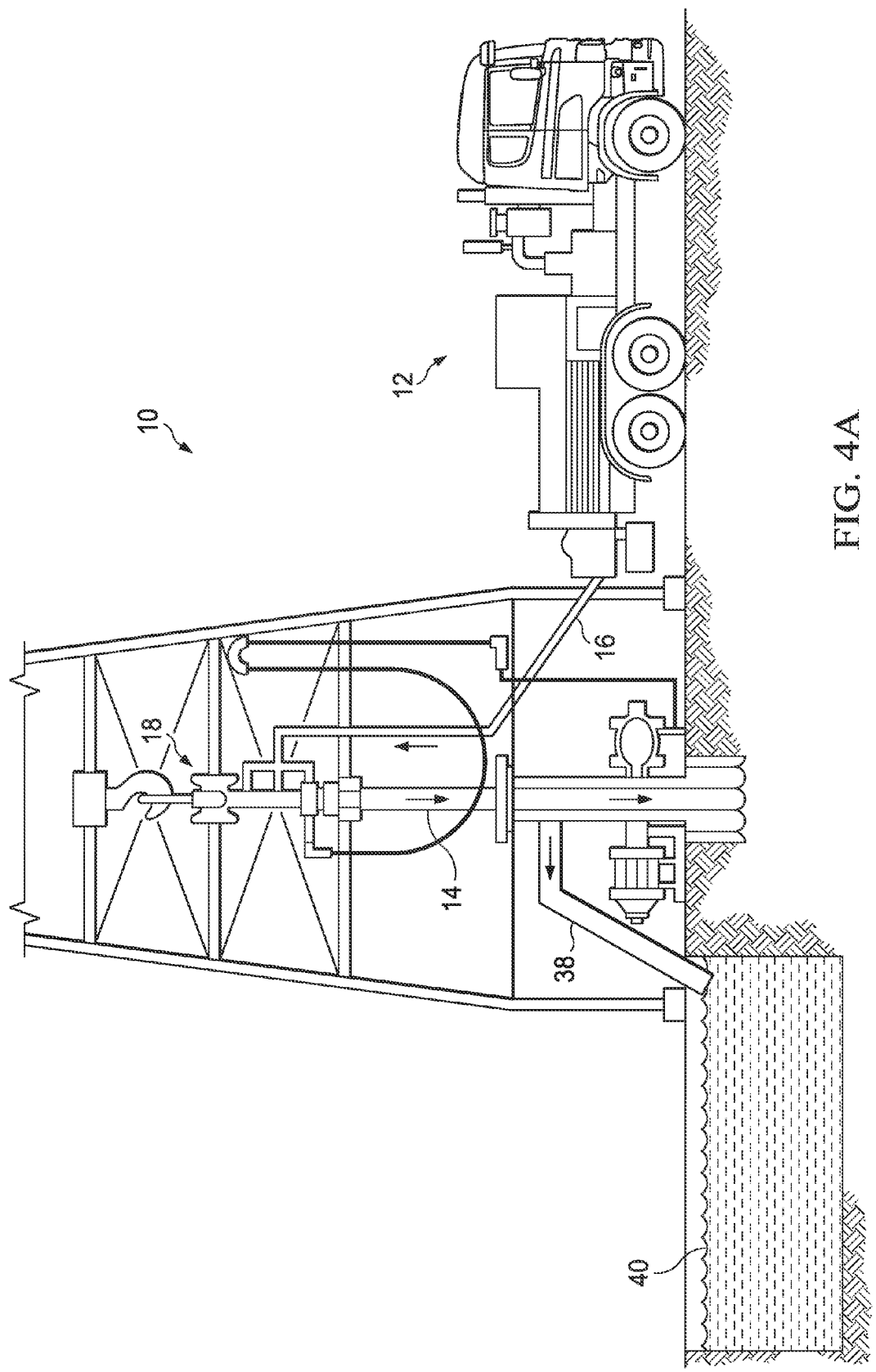
FIG. 4A illustrates surface equipment that may be used in placement of cement in a wellbore.

Turning now to FIG. 4B, the cement 14 may be placed into a subterranean formation 20. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. As illustrated, a surface casing 28 has been inserted into the wellbore 22. The surface casing 28 may be cemented to the walls 24 of the wellbore 22 by cement sheath 26. Further as illustrated, one or more additional conduits (e.g., intermediate casing, production casing, liners, etc.) shown here as casing 30 may also be disposed in the wellbore 22. As illustrated, there is a wellbore annulus 32 formed between the casing 30 and the walls 24 of the wellbore 22 and/or the surface casing 28. One or more centralizers 34 may be attached to the casing 30, for example, to centralize the casing 30 in the wellbore 22 prior to and during the cementing operation.

With continued reference to FIG. 4B, the cement 14 may be pumped down the interior of the casing 30. The cement 14 may be allowed to flow down the interior of the casing 30 through the casing shoe 42 at the bottom of the casing 30 and up around the casing 30 into the wellbore annulus 32. The cement 14 may be allowed to set in the wellbore annulus 32, for example, to form a cement sheath that supports and positions the casing 30 in the wellbore 22. While not illustrated, other techniques may also be utilized for introduction of the cement 14. By way of example, reverse circulation techniques may be used that include introducing the cement 14 into the subterranean formation 20 by way of the wellbore annulus 32 instead of through the casing 30.

As it is introduced, the cement 14 may displace other fluids 36, such as drilling fluids and/or spacers, that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 4A. Referring again to FIG. 4B, a bottom plug 44 may be introduced into the wellbore 22 ahead of the cement 14, for example, to separate the cement 14 from the fluids 36 that may be inside the casing 30 prior to cementing. After the bottom plug 44 reaches the landing collar 46, a diaphragm or other suitable device ruptures to allow the cement 14 through the bottom plug 44. In FIG. 4B, the bottom plug 44 is shown on the landing collar 46. As illustrated, a top plug 48 may be introduced into the wellbore 22 behind the cement 14. The top plug 48 may push the cement 14 through the bottom plug 44.

It should be noted that, while FIG. 4 generally depicts a land-based drilling assembly, those skilled in the art would readily recognize that the principles described herein are equally applicable to subsea drilling operations that employ floating or sea-based platforms and rigs, without departing from the scope of the disclosure.

Proppant Delivery Methods

During well stimulation treatments, such as fracturing treatments, the proppant delivery fluid generally has a viscosity that is sufficient to suspend proppant particles and to place the proppant particles in fractures, inter alia, to maintain the integrity of those fractures once the hydraulic pressure is released. After the proppant is placed in the fracture and pumping stops, the fracture closes. The pores of the proppant bed and the surrounding formation are filled with the fracturing fluid and should be cleaned out to maximize conductivity of the proppant-filled fracture. Once at least one fracture is created and the proppant is substantially in place, the viscosity of the fracturing fluid usually is reduced by breaking the viscosified treatment fluid via function of a breaking agent, thereby depositing the proppant and allowing the fluid to be recovered from the formation. Proppant delivery fluids of the present disclosure may allow breaking, or may provide for proppant delivery without breaking.

During proppant delivery treatments, the proppant delivery fluid generally has a viscosity that is sufficient to suspend the proppant and to place the proppant in the desired location. The proppant delivery fluid may be placed in a wellbore similar to that shown in FIGS. 1 through 4 using suitable equipment, such as equipment similar to that shown in FIG. 3.

EXAMPLES

To facilitate a better understanding of the present disclosure, the following examples are given.

Example 1: Drilling Fluid Rheology and Stability

A medium-density water-based drilling fluid was formed from 3.5 g (1.1% bwow) LAPONITE RD® (BYK ADDITIVES LTD.) synthetic hectorite, 32 g cellulose nanofibrils suspension (which contains 3% cellulose nanofibrils (University of Maine pilot plant) and 97% water), 308.1 g tap water at a pH of 11-12 (achieved by addition of soda ash, $Na_2CO_3$), and 310.93 g barite heavy-weight additive particles (for density control). Although this drilling fluid was medium-density (13.5 parts per gallon (ppg) in this example), the same principles may be applied for low-density and high-density drilling fluids with similar results.

The ingredients were mixed in a micro-mixer for 10 minutes, then hydration of the cellulose was allowed to proceed to generate a micro-structure able to suspend the barite particles. The rheological properties of the drilling fluid were evaluated using a standard bob-sleeve geometry in a viscometer (see TABLE 1).

After rheological evaluation, the drilling mud was placed in a pressure cell that was pressurized with nitrogen gas to 500 psi. The drilling mud was subjected to a hot-roll from room temperature to 400° F., and was then held at 400° F. for a period of 24 hours while being hot-rolled. The temperature was allowed to cool back to room temperature and the nitrogen gas was released. The rheology of the drilling fluid was evaluated again using a standard bob-sleeve geometry in a viscometer (see TABLE 1). Upon observation, the hot-rolled drilling fluid was stable and suspended the barite particles. After this process, some free water was observed, but could be mixed into the drilling fluid again.

TABLE 1

Rheology Data From Hot-Rolled Drilling Fluid

| Test temperature | before hot-roll at room temperature Room temperature | after hot-roll and cooling at back to room temperature Room temperature | after hot-roll and cooling back to room temperature 120° F. |
| --- | --- | --- | --- |
| 600 rpm | 47 | 69 | 44 |
| 300 rpm | 33 | 55 | 35 |
| 200 rpm | 25 | 48 | 31 |
| 100 rpm | 22 | 41 | 27 |
| 6 rpm | 16 | 32 | 21 |
| 3 rpm | 9 | 28 | 12 |

These rheology measurements also demonstrate that the drilling fluid was able to suspend the barite particles, even after extended periods at high temperatures.

Gel strength was also evaluated by determining the maximum deflection of the bob in the rheology tests at 6 rotations per minute (rpm). Measurements were made after hot-roll and return to room temperature. Wait time after return to room temperature is noted in the results, presented in TABLE 2.

TABLE 2

Gel Strength Data From Hot-Rolled Drilling Fluid

| Wait time | Gel Strength |
| --- | --- |
| 10 seconds | 16 lb/100 ft$^2$ |
| 5 minutes | 21 lb/100 ft$^2$ |
| 30 minutes | 25 lb/100 ft$^2$ |

Example 2: Drilling Fluid Rheology and Stability in the Presence of Salt

A medium-density water-based drilling fluid was formed from 3.5 g (1.1% bwow) LAPONITE RD® synthetic hectorite, 32 g cellulose nanofibrils suspension (which contains 3% cellulose nanofibrils (University of Maine pilot plant) and 97% water), 308.1 g tap water at a pH of 11-12 (achieved by addition of soda ash, $Na_2CO_3$), 310.93 g barite heavy-weight additive particles (for density control), and 94.2 g sodium chloride (NaCl). Although this drilling fluid was medium-density (13.5 ppg in this example), the same principles may be applied for low-density and high-density drilling fluids with similar results.

The ingredients were mixed in a micro-mixer for 10 minutes, then hydration of the cellulose was allowed to proceed to generate a micro-structure able to suspend the barite particles. The rheological properties of the drilling fluid were evaluated using a standard bob-sleeve geometry in a viscometer (see TABLE 3).

After rheological evaluation, the drilling mud was placed in a pressure cell that was pressurized with nitrogen gas to 500 psi. The drilling mud was subjected to a hot-roll from room temperature to 400° F., and was then held at 400° F. for a period of 24 hours while being hot-rolled. The temperature was allowed to cool back to room temperature and the nitrogen gas was released. The rheology of the drilling fluid was evaluated again using a standard bob-sleeve geometry in a viscometer (see TABLE 3). Upon observation, the hot-rolled drilling fluid was stable and suspended the barite particles. After this process, some free water was observed, but could be mixed into the drilling fluid again.

TABLE 3

Rheology Data From Hot-Rolled Drilling Fluid

| Test temperature | before hot-roll at room temperature Room temperature | after hot-roll and cooling at back to room temperature Room temperature | after hot-roll and cooling back to room temperature 120° F. |
| --- | --- | --- | --- |
| 600 rpm | 33 | 24 | 21 |
| 300 rpm | 22 | 13 | 12 |
| 200 rpm | 17 | 9 | 9 |
| 100 rpm | 12 | 6 | 7 |
| 6 rpm | 6 | 4 | 7 |
| 3 rpm | 5 | 4 | 7 |

Example 3: Spacer Rheology and Stability

A first spacer was formed from 1.5 g (1.7% bwow) LAPONITE RD® synthetic hectorite, 15 g cellulose nanofibrils suspension (which contains 3% cellulose nanofibrils (University of Maine pilot plant) and 97% water), 89.42 g tap water at a pH of 10-11 (achieved by addition of soda ash, $Na_2CO_3$), and 86.45 g barite heavy-weight additive particles (for density control).

A second spacer was formed from 1.5 g (1.7% bwow) LAPONITE RD® synthetic hectorite, 10 g cellulose nanofibrils suspension (which contains 3% cellulose nanofibrils and 97% water), 84.57 g tap water at a pH of 10-11 (achieved by addition of soda ash, $Na_2CO_3$), and 86.45 g barite heavy-weight additive particles (for density control).

The ingredients were mixed in a jar blender at around 1700-1800 rpm for 5 minutes. Then for each test, a portion of each sample was immediately transferred to a viscometer equipped with a B5X bob. The shear rate was kept constant at an equivalent rpm of 25 rpm to simulate shear rate experienced by downhole fluids being pumped downhole. The temperature was increased to 200° F., 300° F., and 400° F., in three different tests respectively, at a rate of 3° F. per minute then held constant at the final temperature for 6 hours. The mixtures were then allowed to cool to room temperature naturally. For each sample, the barite remained suspended when the product was removed from the viscometer and there was only a negligible amount of free water (1-2 drops), indicating that the product had remained stable throughout the test.

Figure 5:
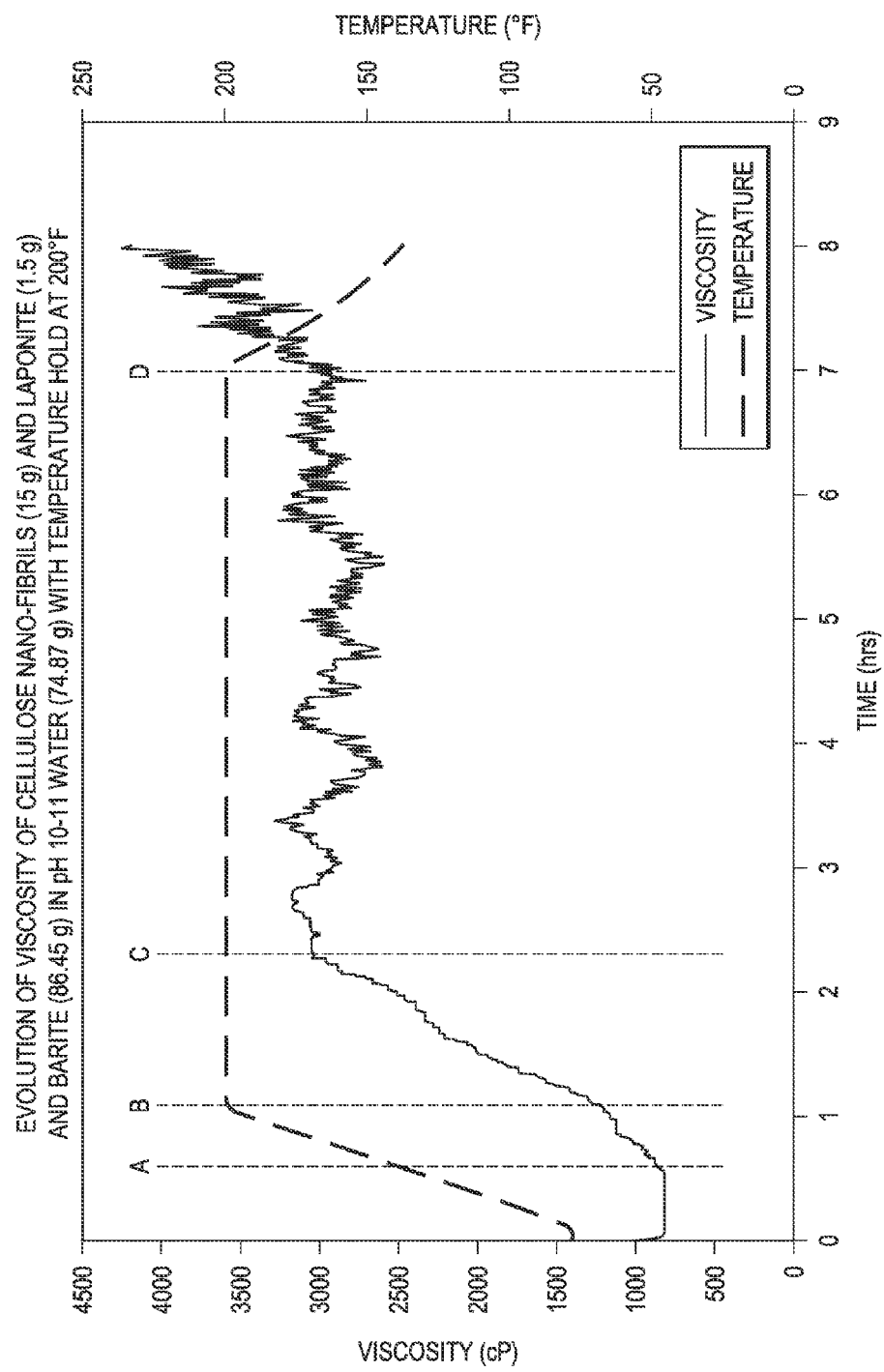
FIG. 5 is viscosity data for a spacer at 200° F.

The first spacer was used to evaluate the thermal stability of the spacer while holding the product at 200° F. and at 300° F. for a period of 6 hours. Data at 200° F. is provided in FIG. 5 and shows a flat viscosity profile, indicating stability for at least 6 hours. In addition, the data presented in FIG. 5 shows that the viscosity at surface temperature (80° F.) started low at around 800 cP, which enables ease of pumping into the wellbore. The spacer viscosity started to increase at around 150° F., which is indicated by point A in FIG. 5. Even after the spacer reached the set temperature of 200° F. at point B in FIG. 5, the viscosity of the spacer continued to evolve and remained sufficiently high to suspend barite particles. Viscosity evolution was completed after roughly 2.5 hours, as indicated by point C in FIG. 5, when it has reached approximately 3000 cP. Viscosity remained stable until the spacer began to cool at point D in FIG. 5. This indicates that as the spacer is pumped through the annulus to the surface, it may retain its ability to suspend barite particles.

Figure 6:
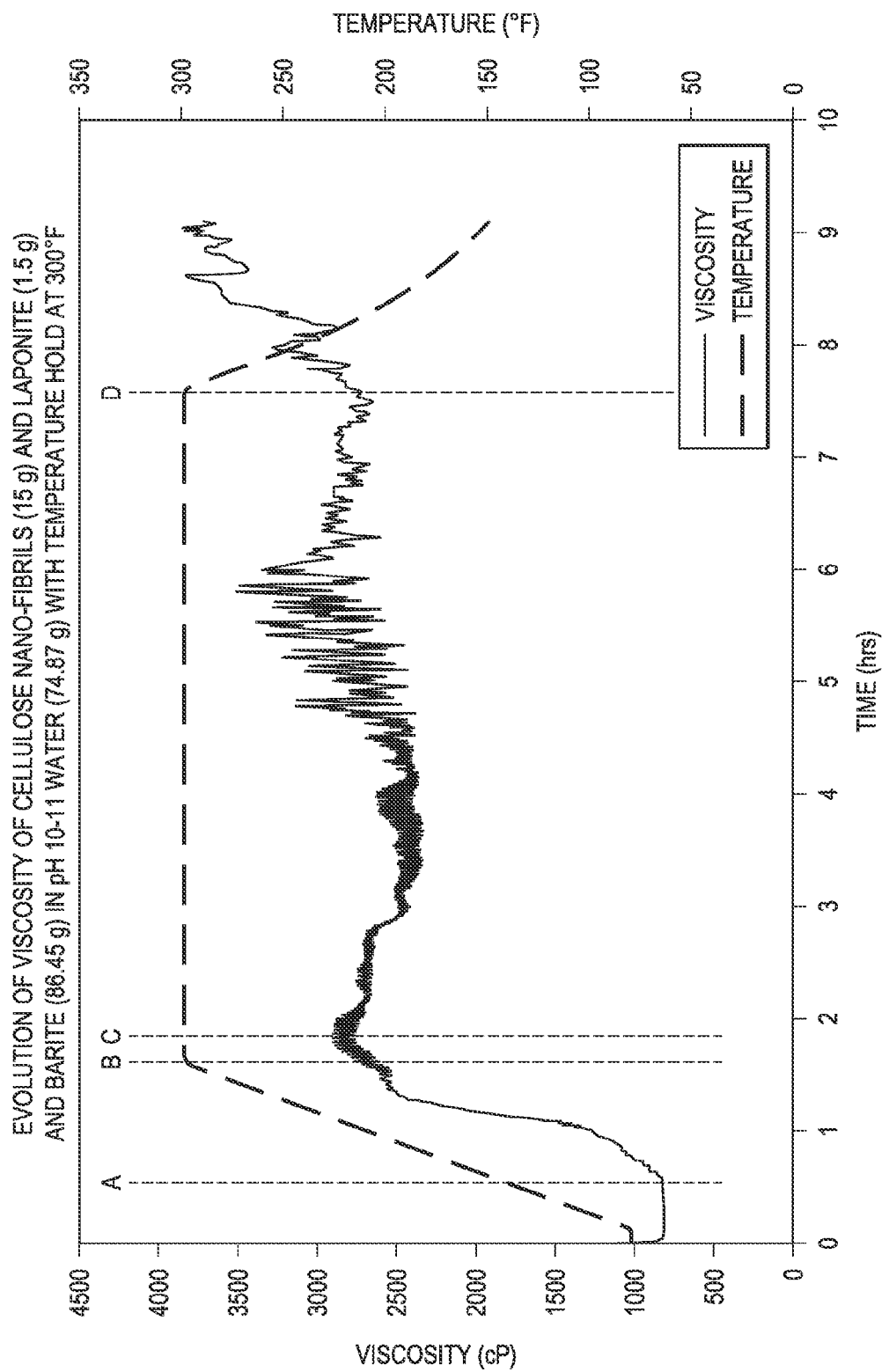
FIG. 6 is viscosity data for a spacer at 300° F.

The first spacer was also used to evaluate the thermal stability of the spacer while holding the product at 300° F. for a period of 6 hours. Data for this experiment is provided in FIG. 6 and also shows a flat viscosity profile, indicating stability for at least 6 hours. In addition, the data presented in FIG. 6 shows that the viscosity at surface temperature (80° F.) started low at around 800 cP, which enables ease of pumping into the wellbore. The spacer viscosity started to increase at around 150° F., which is indicated by point A in FIG. 6. Even after the spacer reached the set temperature of 300° F. at point B in FIG. 6 and had a viscosity of around 2800 cP, the viscosity of the spacer continued to evolve and remained sufficiently high to suspend barite particles. Viscosity evolution was completed after roughly 2 hours, as indicated by point C in FIG. 6, when it has reached approximately 3000 cP. Viscosity remained stable until the spacer began to cool at point D in FIG. 6. This indicates that as the spacer is pumped through the annulus to the surface, it may retain its ability to suspend barite particles.

The second spacer was used to evaluate the thermal stability of the viscosity of the spacer while holding the product at 400° F. for a period of 6 hours. The second spacer was used for this evaluation at 400° F. because it contained a reduced amount of cellulose, which was believed to cause oscillation in the viscosity measurements in the first spacer. Although some oscillations were still observed with the second spacer, measurements could be obtained. It is important to note that these oscillations did not correspond with any observed failure of either spacer. When both the first and second spacers were removed from the viscometer, the fluids were stable with negligible amounts of free water (1-2 drops) and no indication of barite settling.

Figure 7:
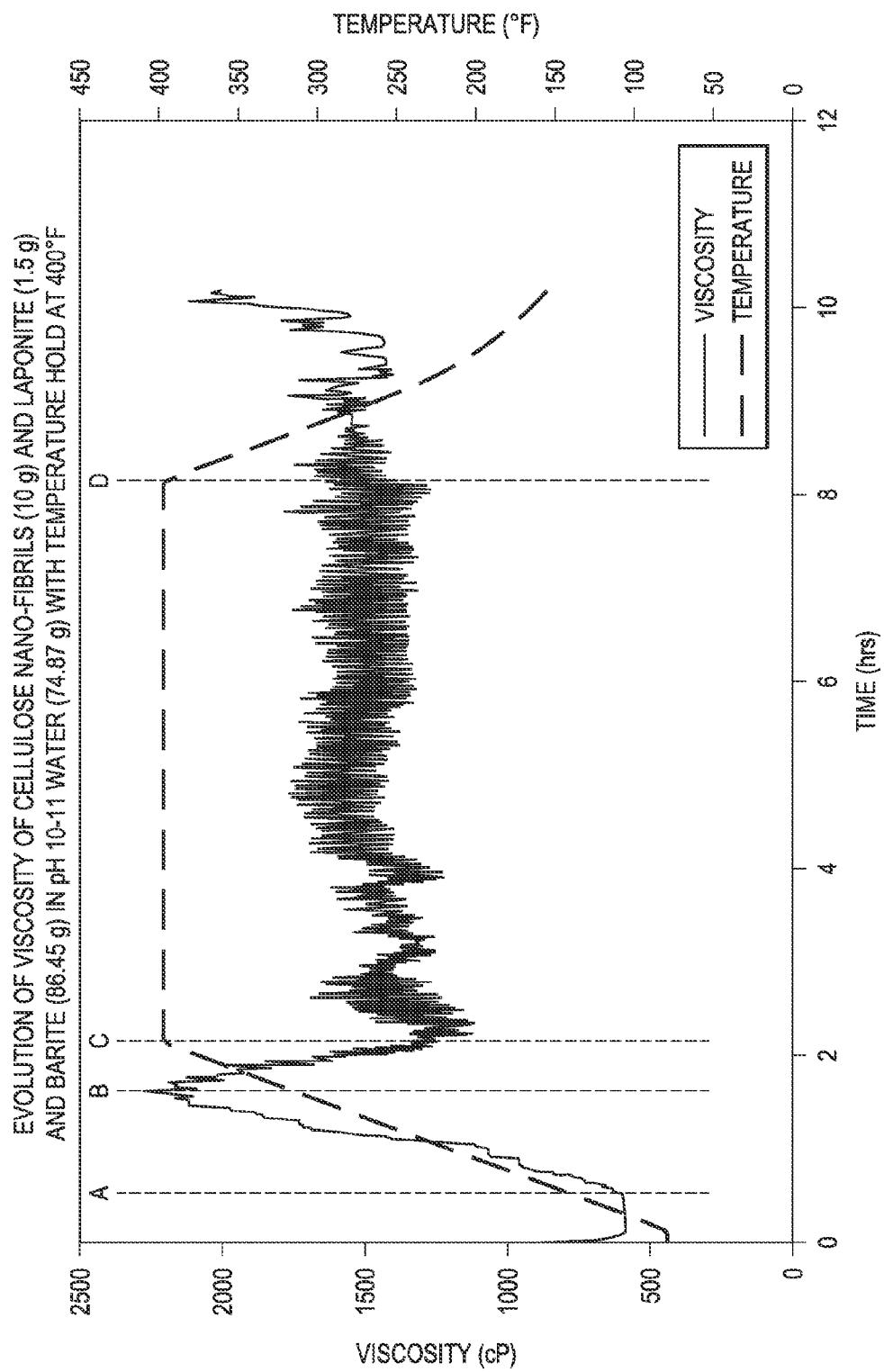
FIG. 7 is viscosity data for a spacer at 400° F.

Data for the second spacer at 400° F. is provided in FIG. 7 and also shows a flat viscosity profile, indicating stability for at least 6 hours. In addition, the data presented in FIG. 7 shows that the viscosity at surface temperature (80° F.) starts low at around 600 cP, which enables ease of pumping into the wellbore. This viscosity was lower than the viscosity at the same temperature for the first spacer because the second spacer contained less cellulose. The spacer viscosity started to increase at around 150° F., which is indicated by point A in FIG. 7. The spacer reached the set temperature of 300° F. at point B in FIG. 7 and had a viscosity of around 2800 cP. This represented the maximum viscosity of the spacer. The viscosity of the spacer reduced to around 1400 cP to 1500 cP by point C in FIG. 7, indicating thermal thinning at temperatures above 300° F., but slowly increased again over time to around 1600 cP. The spacer retained a viscosity sufficiently high to suspend barite particles. Viscosity remained stable until the spacer began to cool at point D in FIG. 7. This indicates that as the spacer is pumped through the annulus to the surface, it may retain its ability to suspend barite particles.

Example 4: Spacer Rheology and Stability

Spacers with clay alone, cellulose alone or with a clay/cellulose additive according to the present disclosure were prepared and tested.

A clay spacer was formed from 1.5 g LAPONITE RD® synthetic hectorite, 74.87 g tap water at a pH of 10-11 (achieved by addition of soda ash, $Na_2CO_3$), and 86.45 g barite heavy-weight additive particles (for density control).

A cellulose spacer was formed from 26.33 g cellulose nano-fibrils suspension (which contains 3% cellulose nano-fibrils (University of Maine pilot plant) and 97% water), 74.87 g tap water at a pH of 10-11 (achieved by addition of soda ash, $Na_2CO_3$), and 86.45 g barite heavy-weight additive particles (for density control).

A clay/cellulose spacer was formed from 1.5 g LAPONITE RD® synthetic hectorite, 26.33 g cellulose nano-fibrils suspension (which contains 3% cellulose nano-fibrils and 97% water), 74.87 g tap water at a pH of 10-11 (achieved by addition of soda ash, $Na_2CO_3$), and 86.45 g barite heavy-weight additive particles (for density control).

Each spacer was mixed in a blender jar at 2000 rpm for 5 minutes. Increasing the mixing time to 35 minutes did not significantly increase starting viscosity (difference were in the range of 10-20%). Then for each test, a portion of each sample was immediately transferred to a viscometer equipped with a B5X bob. The shear rate was kept constant at an equivalent rpm of 25 rpm to simulate shear rate experienced by fluids being pumped downhole. The temperature was increased to 400° F. at a rate of 3° F. per minute then allowed to cool to room temperature naturally.

Figure 8:
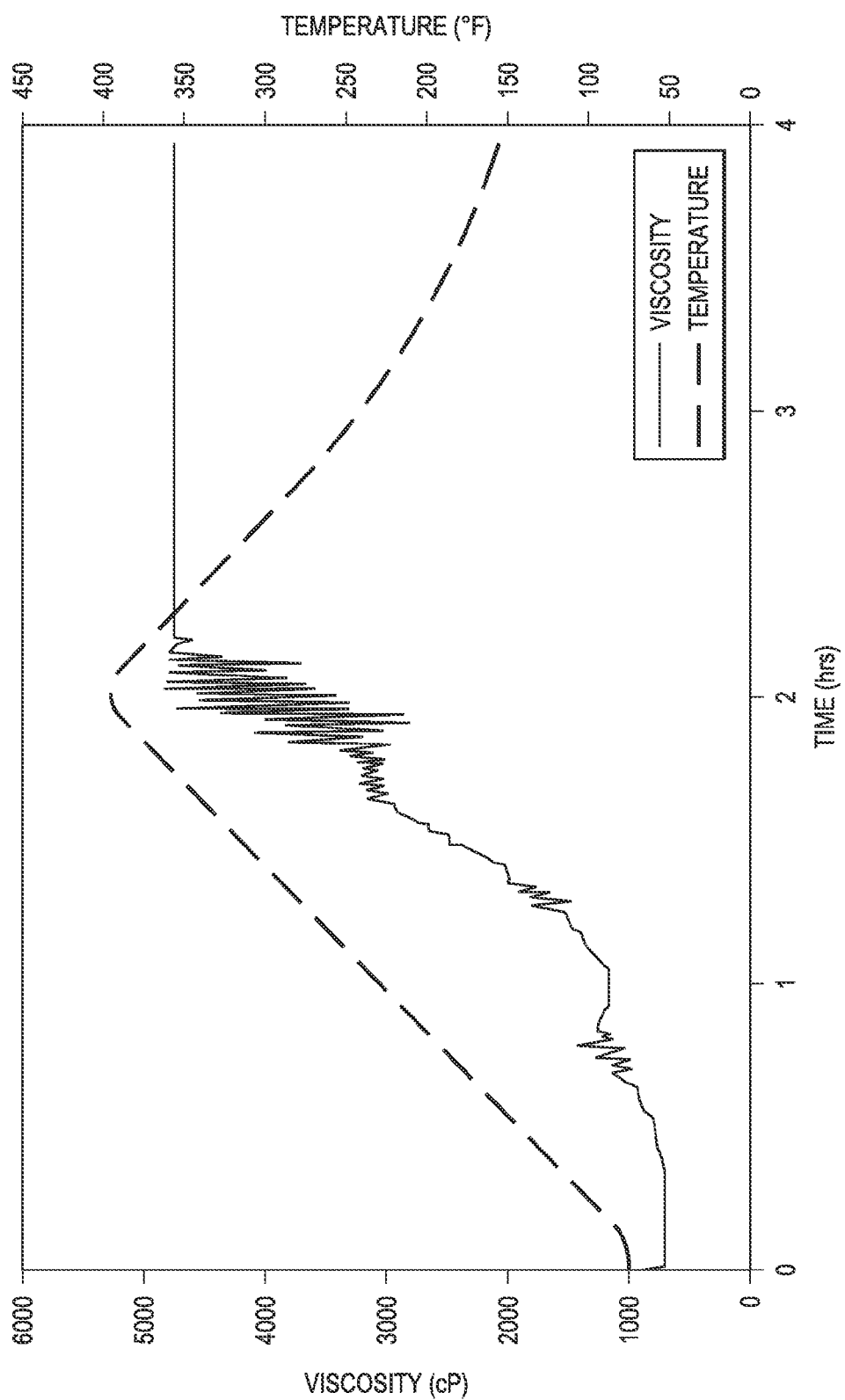
FIG. 8 is viscosity data for a spacer containing a clay additive as a suspending aid, as a control test.

Results for the clay spacer are presented in FIG. 8. With this spacer, the viscosity rose quite rapidly after 230° F., reaching a maximum at around 320° F. This indicates uncontrolled viscosity generation, which would require additional pumping energy to move the cement into the wellbore. Furthermore, upon reduction of the temperature from 400° F., there was no indication of thermal thixotropy.

Figure 9:
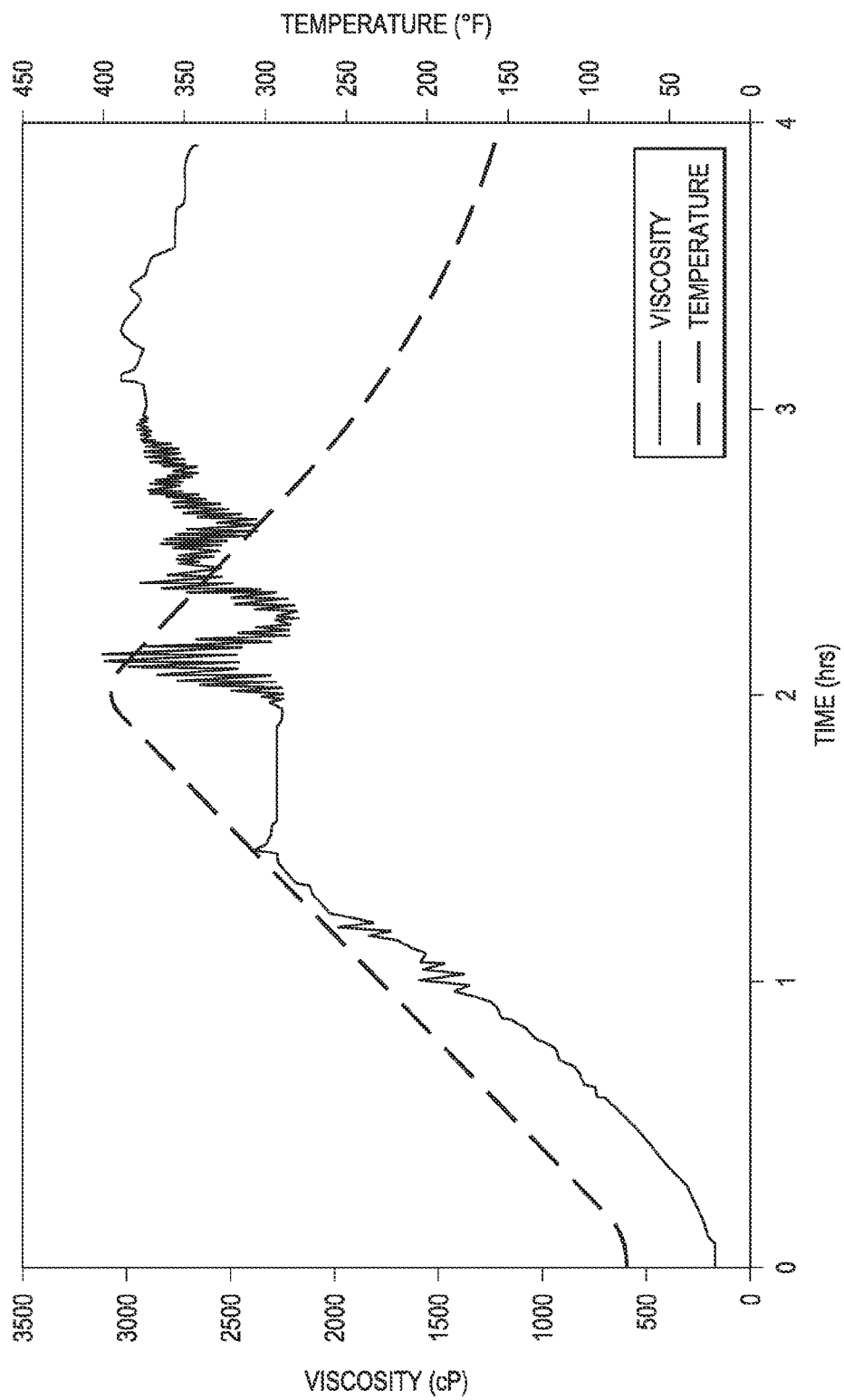
FIG. 9 is viscosity data for a spacer containing a cellulose additive as a suspending aid, as a control test

Results for the cellulose spacer are presented in FIG. 9. With this spacer, viscosity rise steadily to about 315° F., then did not show significant additional variation with temperature. Furthermore, upon reduction of the temperature from 400° F., there was no indication of thermal thixotropy. Upon removal from the test equipment, this sample contained a large amount of free water, indication it was not stable at the temperatures tested.

Figure 10:
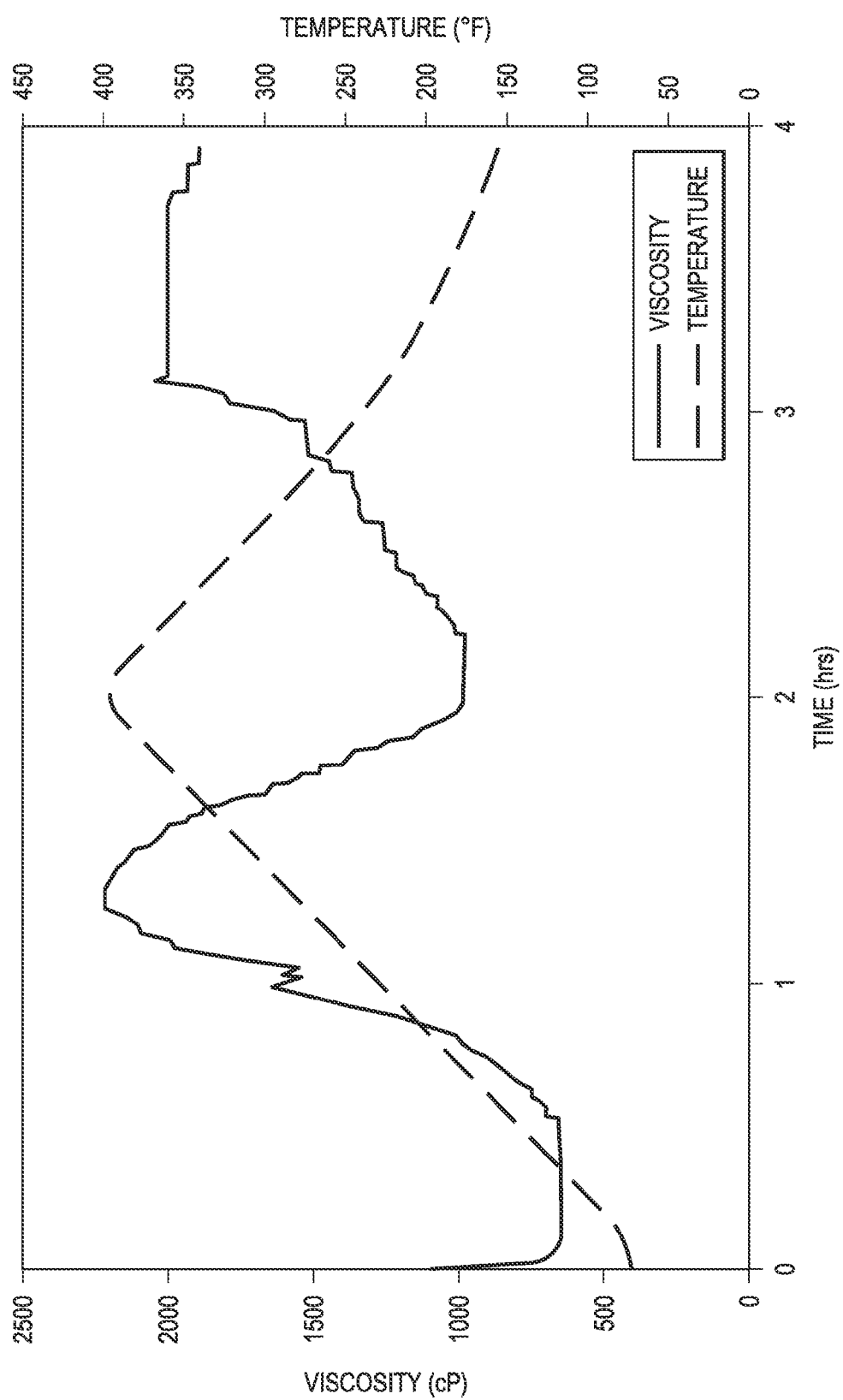
FIG. 10 is viscosity data for a spacer containing a clay/cellulose additive as a suspending aid, according to the present disclosure.

Results for the clay/cellulose spacer are presented in FIG. 10. With this spacer the viscosity rose rapidly between 150° F. to 300° F., but in a controlled manner, then dropped rapidly as the temperature is further increased to 400° F. due to thermal thinning. Upon cooling, the material exhibited thixotropy and the viscosity increased again to nearly the earlier maximum viscosity observed while heating. Such a thermally thixotropic system is able to suspend the heavy barite particles in the spacer. Furthermore, when the cement was removed from the equipment after testing, very little (1-2 drops) of free water was observed, indicating stability of the cement at the temperatures tested. Overall, although neither laponite nor cellulose alone gave rise to a suitable spacer, the combination provided a very stable and controlled spacer.

Example 5: Cement Additive as a Salt Shield

A basic cement was formed from 100% bwoc Class G cement base (a Portland cement containing no additions other than calcium sulfate or water, per American Petroleum Institute (API) standard API Spec. 10A), 0.05% bwoc SA-1015™ (HALLIBURTON ENERGY SERVICES, INC.) suspending agent, and 5.3 gallons/sack (gal/sk) fresh water. The cement slurry had a density of 15.6 pounds per gallon (ppg).

A first salt additive cement was formed from 100% bwoc Class G cement base, 0.05% bwoc SA-1015™ suspending agent, 34% bwoc NaCl, and 6.07 gal/sk fresh water. The cement slurry had a density of 15.6 ppg.

A second salt additive cement was formed from 100% bwoc Class G cement base, 0.1% bwoc SA-1015™ suspending agent, 34% bwoc NaCl, and 6.07 gal/sk fresh water. The cement slurry had a density of 15.6 ppg.

The basic cement and salt additive cement control slurries contained SA-1015 suspending agent to hold the slurry in suspension while testing. Salt was added to the salt additive cement slurries to test the effects of salt on SA-1015 at two different suspending agent concentrations to see if the suspending agent at higher concentrations could hold the cement in suspension.

These slurries were mixed as prescribed in API Recommended Practice 10B for wetting of the components at 4000 rpm for 25 second, followed by homogenization at 12000 rpm for 35 seconds.

A first clay/cellulose additive cement was formed from 100% bwoc Class G cement base, 0.05% bwoc SA-1015™ suspending agent, 34% bwoc NaCl, 1% bwoc LAPONITE EP® (BYK ADDITIVES LTD.) synthetic hectorite, 3× by weight of LAPONITE EP nanocellulose (University of Maine pilot plant) with 3% activity in suspension, and 5.94 gal/sk fresh water. The cement slurry had a density of 15.6 ppg. This first clay/cellulose additive cement was designed to evaluate any synergistic effects between the SA-1015 suspending agent and the clay/cellulose cement additive in the presence of salt.

A second clay/cellulose additive cement was formed from 100% bwoc Class G cement base, 34% bwoc NaCl, 1% bwoc LAPONITE EP® (BYK ADDITIVES LTD.) synthetic hectorite, 3× by weight of LAPONITE EP nanocellulose (University of Maine pilot plant) with 3% activity in suspension, and 5.94 gal/sk fresh water. The cement slurry had a density of 15.6 ppg. This second clay/cellulose additive cement was designed to evaluate the effects of the clay/cellulose cement additive alone in the presence of salt.

These two slurries were prepared by hydrating the laponite and cellulose in fresh water at 2000 rpm for 5 minutes. Then the cement base, salt, and suspending agent (if present) were blended for an additional 5 minutes while mixer rpm was gradually increased to as high as 7500 to 8000 rpm to accommodate more dry solids into suspension. The slurries thus prepared were thick and may need to be less viscous (e.g. contain less clay and/or cellulose by proportion of total slurry) for use in pumping.

After the cement slurries were mixed, they were placed in API sedimentation cylinders in a water bath for curing at 140° F. or 150° F. The curing temperature appeared to have little effect on the stability of the cured samples for the range of temperatures investigated.

After curing, the API cylinder samples were cut into 5 sections, and were tested for density using Archimedes' principle. The density difference was noted from the lowest density section to the highest density section and reported in TABLE 4.

TABLE 4

Effects of Salt on Cement

| Cement | Density difference (in ppg) |
| --- | --- |
| Basic cement | 0.20 |
| First salt additive cement | 0.46 |
| Second salt additive cement | 0.59 |
| First clay/cellulose additive cement | 0.14 |
| Second clay/cellulose additive cement | 0.14 |

As the data in TABLE 4, makes clear, salt greatly disrupted the effectiveness of SA-1015 suspending aid. However, the clay/cellulose additive improved the salt-resistance of the cement. This effect was not influenced by the addition of SA-1015 suspending aid, which is not surprising given it's relative ineffectiveness in the presence of salt.

Example 6: Cement Additive as a Fluid Loss Additive

A clay additive cement was formed from 100% bwoc Class G cement base, 1.2% bwow FDP-C1136 synthetic hectorite, and 36.22 gal/sk deionized water. The cement slurry had a density of 10 ppg.

A cellulose additive cement was formed from 100% bwoc Class G cement base, 1.2% bwow FDP-C1136 synthetic hectorite, 6% bwoc CELLULON® PX (CP KELCO LTD.) 100% activity micro cellulose, provided as solid particles, 1.0% bwoc CFR-3™ (HALLIBURTON ENERGY SERVICES, INC.) cement friction reducer, which helps disperse cellulose, and 36.22 gal/sk deionized water. The cement slurry had a density of 10 ppg.

A first clay/cellulose additive cement was formed from 100% bwoc Class G cement base, 1.2% bwow FDP-C1136 synthetic hectorite, 3% bwoc CELLULON® PX (CP KELCO LTD.) 100% activity micro cellulose, provided as solid particles, and 39.84 gal/sk deionized water. The cement slurry had a density of 10 ppg.

A second clay/cellulose additive cement was formed from 100% bwoc Class G cement base, 1.2% bwow FDP-C1136 synthetic hectorite, 6% bwoc CELLULON® PX (CP KELCO LTD.) 100% activity micro cellulose, provided as solid particles, 1.0% bwoc CFR-3™ cement friction reducer, which helps disperse cellulose, and 36.22 gal/sk deionized water. The cement slurry had a density of 10 ppg.

CFR-3™ was added in some samples because the quantity of cellulose caused mixing difficulties. In each sample, the clay and cellulose (if both present) were mixed in a blender jar at 2000 rpm for 10 minutes. After this hydration, the dry blend of cement base and CFR-3™ (if present) were added and mixed for another 5 minutes at 4000 rpm. The slurry was then conditioned in an atmospheric consistometer at 190° F. for 30 minutes, before conducting fluid loss experiments at 190° F. in a static fluid loss cell according to API Recommended Practice 10B-2. Results are presented in TABLE 5.

TABLE 5

Fluid Loss in Cement Slurries

| | Clay Additive Cement | Cellulose Additive Cement | First Clay/ Cellulose Additive Cement | Second Clay/ Cellulose Additive Cement |
| --- | --- | --- | --- | --- |
| Fluid Loss | 5 min/100 mL | 30 min/47 mL | 28 min/95 mL | 30 mm/33 mL |
| API Fluid Loss | 487 mL | 94 mL | 196 mL | 66 mL |

Cement with clay alone exhibited a large volume of fluid loss quite rapidly. Cellulose alone improved both properties, but when a similar amount of cellulose was used in conjunction with clay (second clay/cellulose additive cement), a very substantial improvement in volume of fluid loss and speed of fluid loss was achieved as compared to clay or cellulose alone.

Example 7: Cement Additive as a Lost Circulation Prevention Additive

A first clay/cellulose additive cement was formed from 100% bwoc Class G cement base, 1.2% bwow FDP synthetic hectorite, 3% bwoc CELLULON® PX 100% activity micro cellulose, provided as solid particles, and 6 gal/sk MICROBLOCK® (HALLIBURTON ENERGY SERVICES, INC.) finely divided, high surface-area silica extender/compressive-strength enhancer/thixotropy imparter, and 40.03 gal/sk deionized water. The cement slurry had a density of 10 ppg.

A second clay/cellulose additive cement was formed from 100% bwoc Class G cement base, 1.2% bwow FDP synthetic hectorite, 3% bwoc CELLULON® PX 100% activity micro cellulose, provided as solid particles, and 6 gal/sk MICROBLOCK® finely divided, high surface-area silica extender/compressive-strength enhancer/thixotropy imparter, 0.4% bwoc SCR-742™ (HALLIBURTON ENERGY SERVICES, INC.) high temperature cement retarder, and 0.4% bwoc COMPONENT R® (HALLIBURTON ENERGY SERVICES, INC.) inorganic salt cement retarder, and 43.10 gal/sk deionized water. The cement slurry had a density of 10 ppg.

The first clay/cellulose additive cement was designed for testing at temperatures up to 190° F. For temperatures above 190° F., particularly 350° F., cement retarders were added in the second clay/cellulose additive cement to generate sufficient pump time for use in actual wellbores.

In each sample, the clay and cellulose were mixed in a blender jar at 2000 rpm for 10 minutes. After this hydration, the dry blend of cement base and cement retarder (if present) were added and mixed for another 5 minutes at 4000 rpm. The slurry was then conditioned in an atmospheric consistometer at 190° F. for 30 minutes, before conducting rheology measurements for gel strength in a rheometer at 190° F. Results are presented in TABLE 6.

TABLE 6

Gel Strength of First Clay/Cellulose Additive Cement

| rpm | Room Temperature | 190° F. |
| --- | --- | --- |
| 300 | 75 | 56 |
| 200 | 72 | 52 |
| 100 | 70 | 50 |
| 6 | 63 | 42 |
| 3 | 60 | 42 |
| 10 seconds gel strength | 85 | 43 |
| 10 minutes gel strength | 200 | 105 |

Typical field requirements for a lost circulation prevention additive are a 10-minute gel strength of at least 90-100. The first clay/cellulose additive cement met this criteria at both room temperature and 190° F., indicating it's usefulness as a lost circulation prevention additive for cement.

Figure 11:
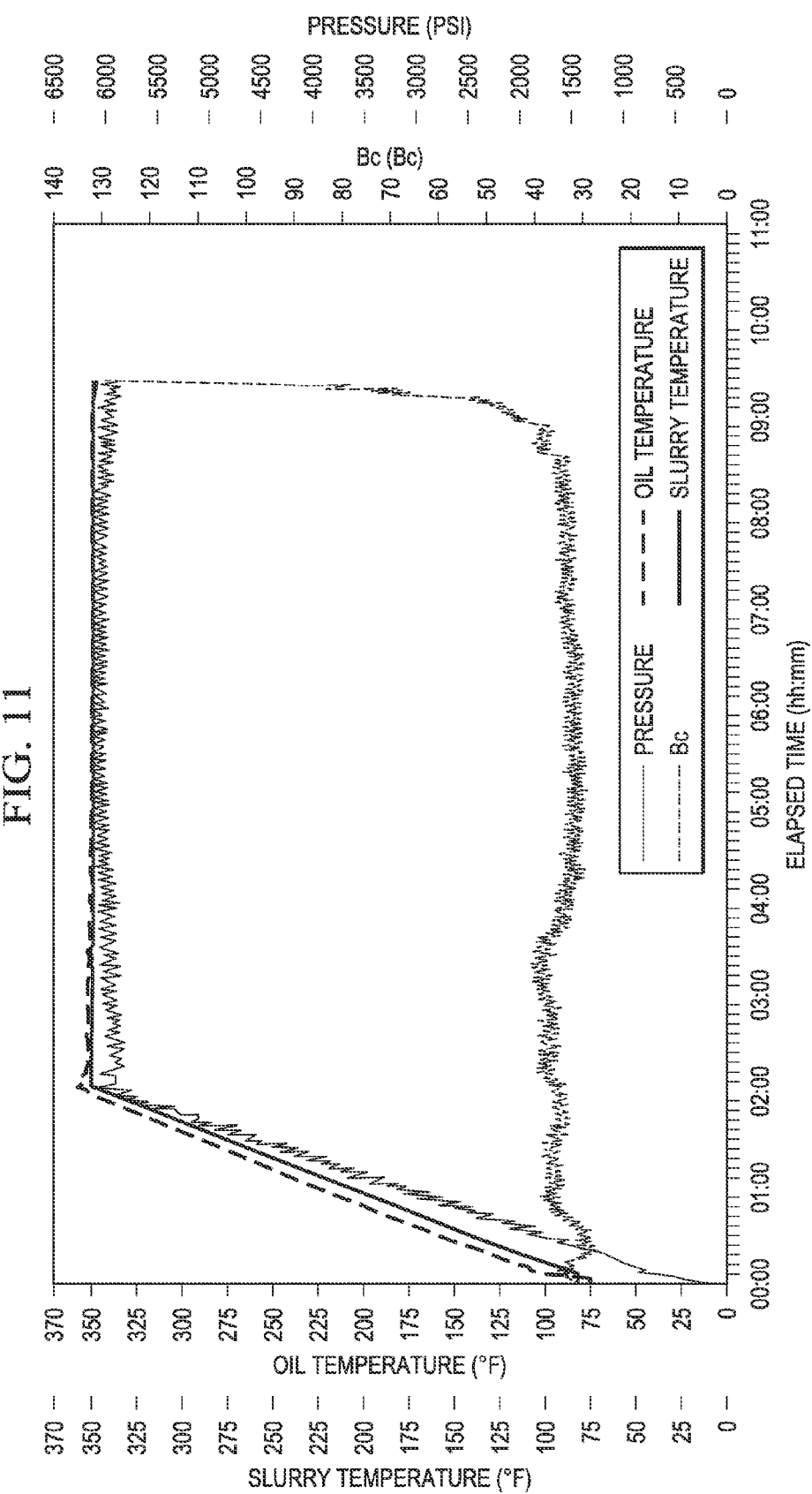
FIG. 11 is consistometer data at 350° F. for cement containing a clay/cellulose additive as a lost circulation prevention additive.

Part of the second clay/cellulose additive cement slurry was placed in a high temperature high pressure consistometer immediately after mixing for tests at 350° F. Thickening time data is presented in FIG. 11. As can be seen in FIG. 11, the cement slurry had a thickening time of greater than 9 hours, indicating it would be suitable for pumping into an actual wellbore. Rheology measurement were conducted in a rheometer at 190° F., the results of which are presented in TABLE 7.

TABLE 7

Gel Strength of Second Clay/Cellulose Additive Cement

| rpm | Room Temperature | 190° F. |
| --- | --- | --- |
| 300 | 97 | 87 |
| 200 | 95 | 87 |
| 100 | 95 | 85 |
| 6 | 85 | 73 |
| 3 | 85 | 73 |
| 10 seconds gel strength | 82 | 74 |
| 10 minutes gel strength | 205 | 165 |

Thus, even with cement retarders added, a cement with a clay/cellulose additive according to the present disclosure retains sufficient gel strength to serve as a lost circulation prevention additive.

Figure 12:
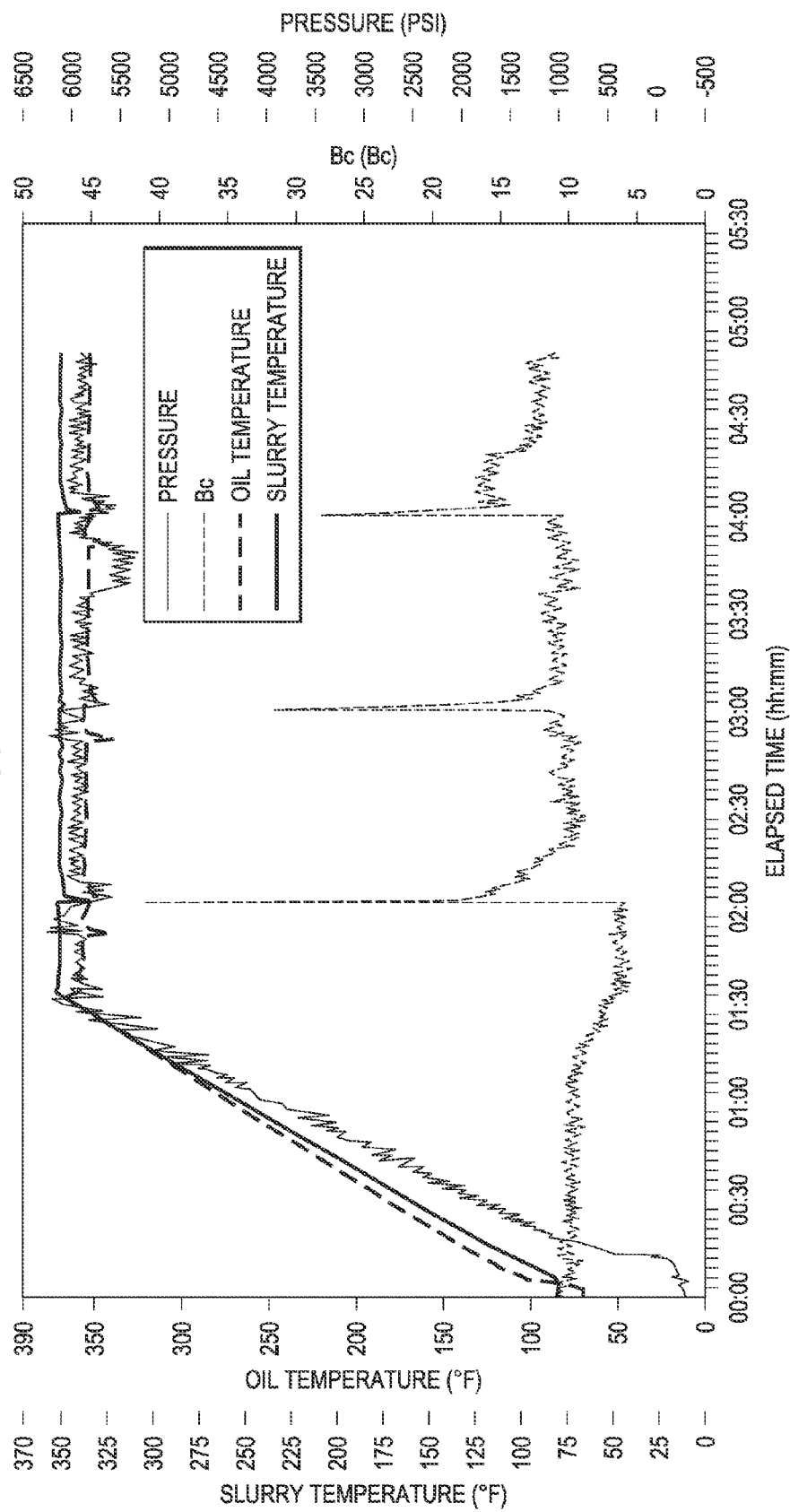
FIG. 12 is consistometer on/off data at 350° F. for cement containing a clay/cellulose additive as a lost circulation prevention additive.

Gel strength of the second clay/cellulose additive cement was also evaluated at 350° F. by performing an on-off test in a consistometer where, after reaching a steady slurry temperature of 350° F., stirring was ceased for 10 minutes, then restarted. Maximum Bearden Units (Bc) deflection was observed upon start-up of stirring, indicating good gel strength development. Results are presented in FIG. 12, which shows a Bc deflection of at least 30 Bc or more when on-off tests were conducted three times. This indicates the development of high gel strength, even at 350° F. and in the presence of cement retarders.

Example 8: Cement Additive as a Gas Migration Control Additive

A cement with a cement additive was formed from 100% bwoc Class G cement base, 1.2% bwow FDP synthetic hectorite, 3% bwoc CELLULON® PX 100% activity micro cellulose, provided as solid particles, and 6 gal/sk MICROBLOCK® finely divided, high surface-area silica extender/compressive-strength enhancer/thixotropy imparter, and 39.84 gal/sk deionized water. The cement slurry had a density of 10 ppg.

Figure 13:
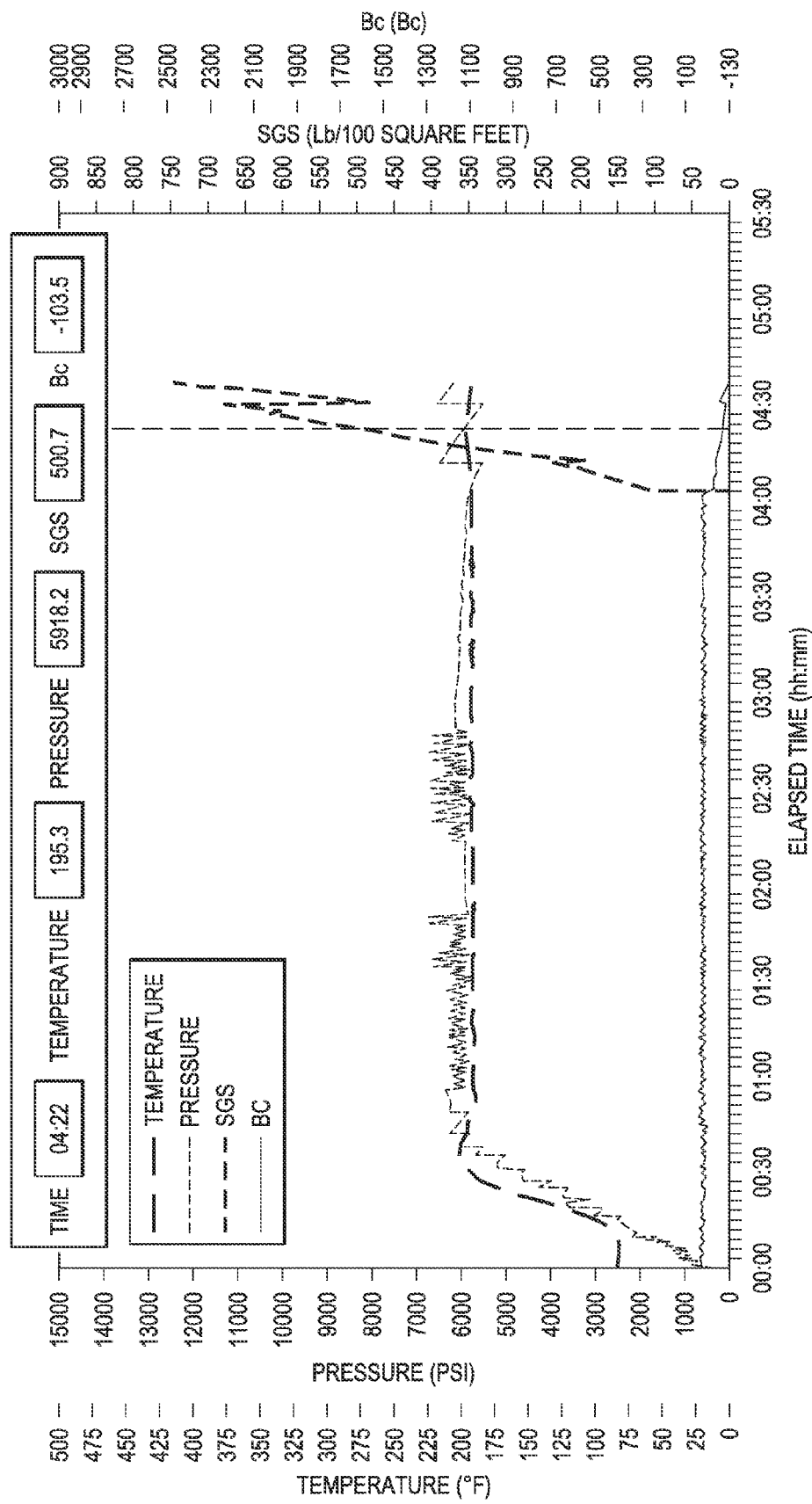
FIG. 13 is gas migration testing of cement containing a clay/cellulose additive as a gas migration control additive.
Figure 14:
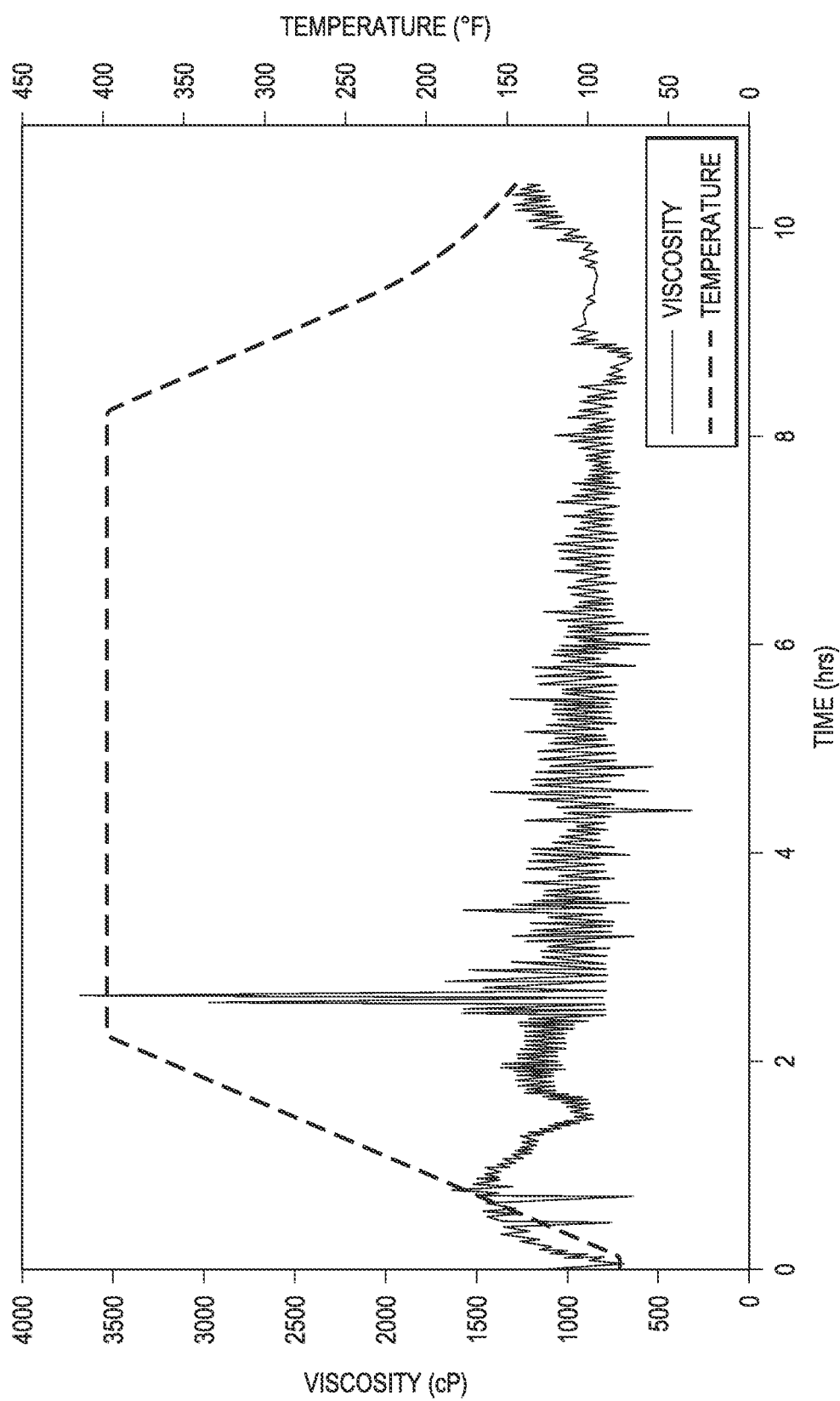
FIG. 14 is viscosity data for a proppant delivery fluid at 400° F.

The clay and cellulose were mixed in a blender jar at 2000 rpm for 10 minutes. After this hydration, the dry blend of cement base and OBLOCK® were added and mixed for another 5 minutes at 4000 rpm. The slurry was conditioned at 190° F. at 6000 psi pressure in a gas migration analyzer, which was then placed in static mode for gel strength development. Results are presented in FIG. 13.

According to API Recommended Practice 10B, for an additive to qualify as a gas migration control additive, the time required for a gel strength from 100 lb/100 ft$^2$ to 500 lb/100 ft$^2$ should be less than 30 minutes. The slurry tested in FIG. 13 had a zero gel time of 3 minutes and gel strength developed to within the prescribed range within 19 minutes, indicating that the cement additive was a gas migration control additive.

Example 9: Proppant Delivery Fluid Additives

A first proppant delivery fluid with a proppant delivery fluid additive was formed from 2.0 g ([x]% bwow) LAPONITE RD® (BYK ADDITIVES LTD.) synthetic hectorite, 10.0 g ([x]% bwow) active cellulose nanofibrils (based on 3% activity in suspension), 74.87 g tap water at a pH of 10-11 (achieved by addition of soda ash, $Na_2CO_3$), and 44.91 g 20-40 (420 μm-840 μm) sand.

A second proppant delivery fluid with a proppant delivery fluid additive was formed from 2.2 g LAPONITE RD® (BYK ADDITIVES LTD.) synthetic hectorite, 8.0 g active cellulose nanofibrils (based on 3% activity in suspension), 74.87 g tap water at a pH of 10-11 (achieved by addition of soda ash, $Na_2CO_3$), and 44.91 g 20-40 (420 μm-840 μm) sand.

Each proppant delivery fluid was mixed in a blender jar at 2000 rpm for 5 minutes. Then for each test, a portion of each sample was immediately transferred to a viscometer equipped with a B5X bob. The shear rate was kept constant at an equivalent rpm of 25 rpm to simulate shear rate experienced by downhole fluids being pumped downhole. The temperature was increased to 400° F. at a rate of 3° F. per minute and held at that temperature for six hours, then allowed to cool to room temperature naturally. A small amount of free water was observed when the first proppant delivery fluid was removed from the test equipment, but none was observed for the second proppant delivery fluid. However, both proppant delivery fluids were homogenous when removed from the test equipment, indicating that sand remained suspended throughout the test conditions.

Figure 15:
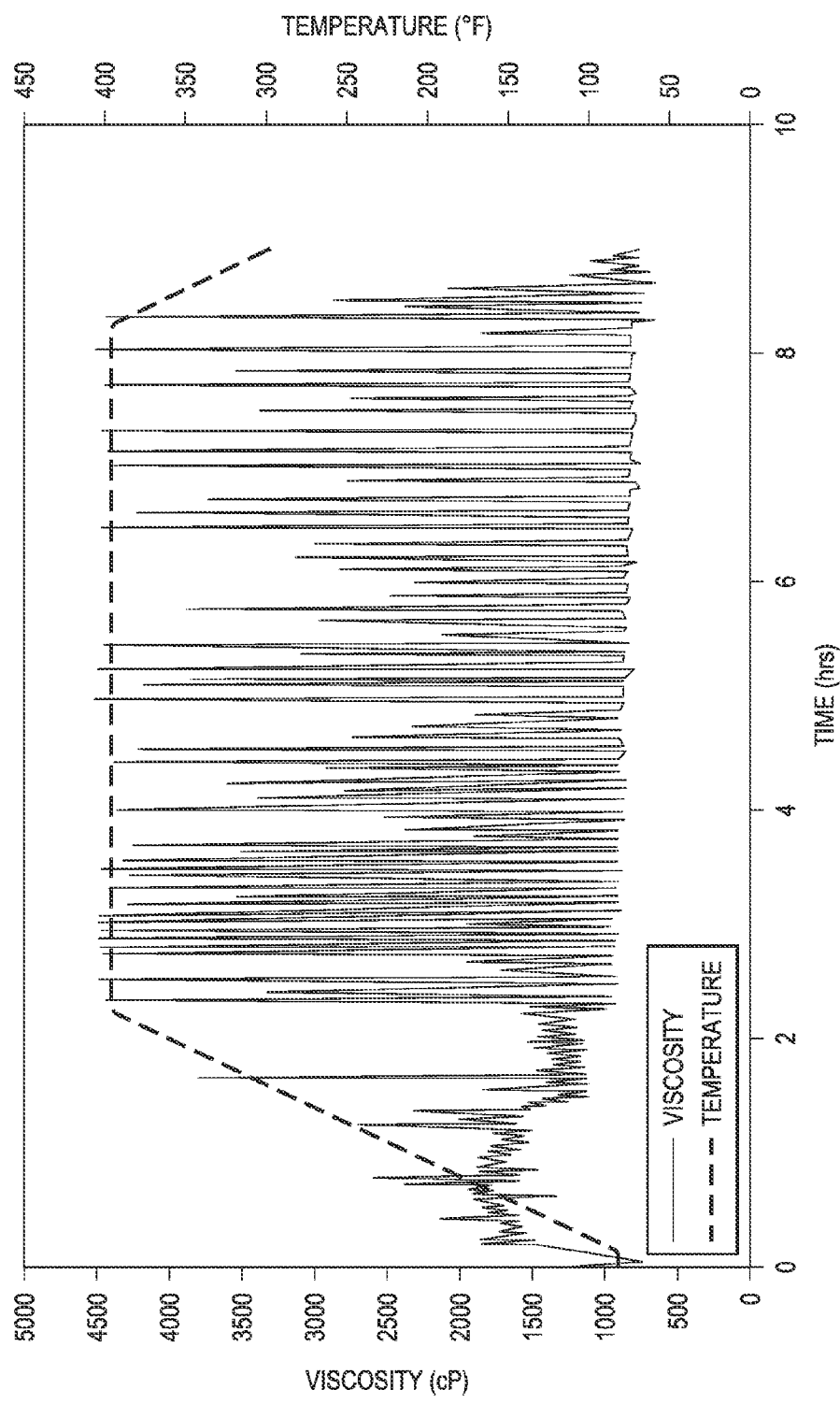
FIG. 15 is viscosity data for another proppant delivery fluid at 400° F.

Results for the first proppant delivery fluid are presented in FIG. 15. The viscosity rose quite rapidly in the first few minutes of heating to 150° F. to a maximum value of around 1700 cP, then reduced to about a value of 800 cP from 150° F. up to 400° F., at which point the viscosity levelled off at that value for the remainder of the test. This indicates an excellent ability of the proppant delivery fluid to suspend the proppant particles at high temperatures, up to at least 400° F. Further, upon reducing the temperature from 400° F., the viscosity showed some signs of increase, indicating that even when the spent proppant-laden gel is pumped through the annulus and back to surface, the gel will hold the proppant and have no stability issues. The viscosity reading exhibits some large spikes in viscosity at around the 3 hour mark, and minor spikes along the other readings. These spikes were unavoidable, and can be attributed to the large particle size of the sand particles, causing minor instantaneous slips along the bob. However, the average of the viscosity readings clearly indicates a good stability of the viscous suspension throughout the test.

Results for the second proppant delivery fluid are presented in FIG. 16. The viscosity again rose quite rapidly in the first few minutes of heating to 150° F. to a maximum value of about 1900 cP, then reduced to about a value of 800 cP from 150° F. up to 400° F., where it levelled off at that value for the remainder of the test. This indicates an excellent ability of the proppant delivery fluid to suspend the proppant particles at high temperatures, up to at least 400° F. The viscosity reading exhibits some large spikes in viscosity throughout the test. As before, these spikes were unavoidable, and can be attributed to the large particle size of the sand particles, causing minor instantaneous slips along the bob. However, the average of the viscosity readings clearly indicates a good stability of the viscous suspension throughout the test.

Example 10: Additional Viscosity Additives

A clay/cellulose spacer was prepared and nano-sized silica particles were added. The silica particles were at 20% activity in suspension. One type of particles, ST-UP (Nissan Chemical Industries, Ltd., Japan) form a chain of particles between 40 nm and 100 nm long. A second type of particles, ST-XS (Nissan Chemical Industries, Ltd.), are spherical particles between 4 nm and 6 nm in size. A third type of particles, ST-XL (Nissan Chemical Industries, Ltd.), are spherical particles between 40 nm and 60 nm in size.

For each test, a portion of each sample was immediately transferred after mixing to a viscometer equipped with a B5X bob. The shear rate was kept constant at an equivalent rpm of 25 rpm to simulate shear rate experienced by downhole fluids being pumped downhole. The temperature was increased to 400° F. at a rate of 3° F. per minute for the control with nano-sized silica particles, or 450° F. for the samples with nano-sized silica particles, then allowed to cool to room temperature naturally.

Figure 16A:
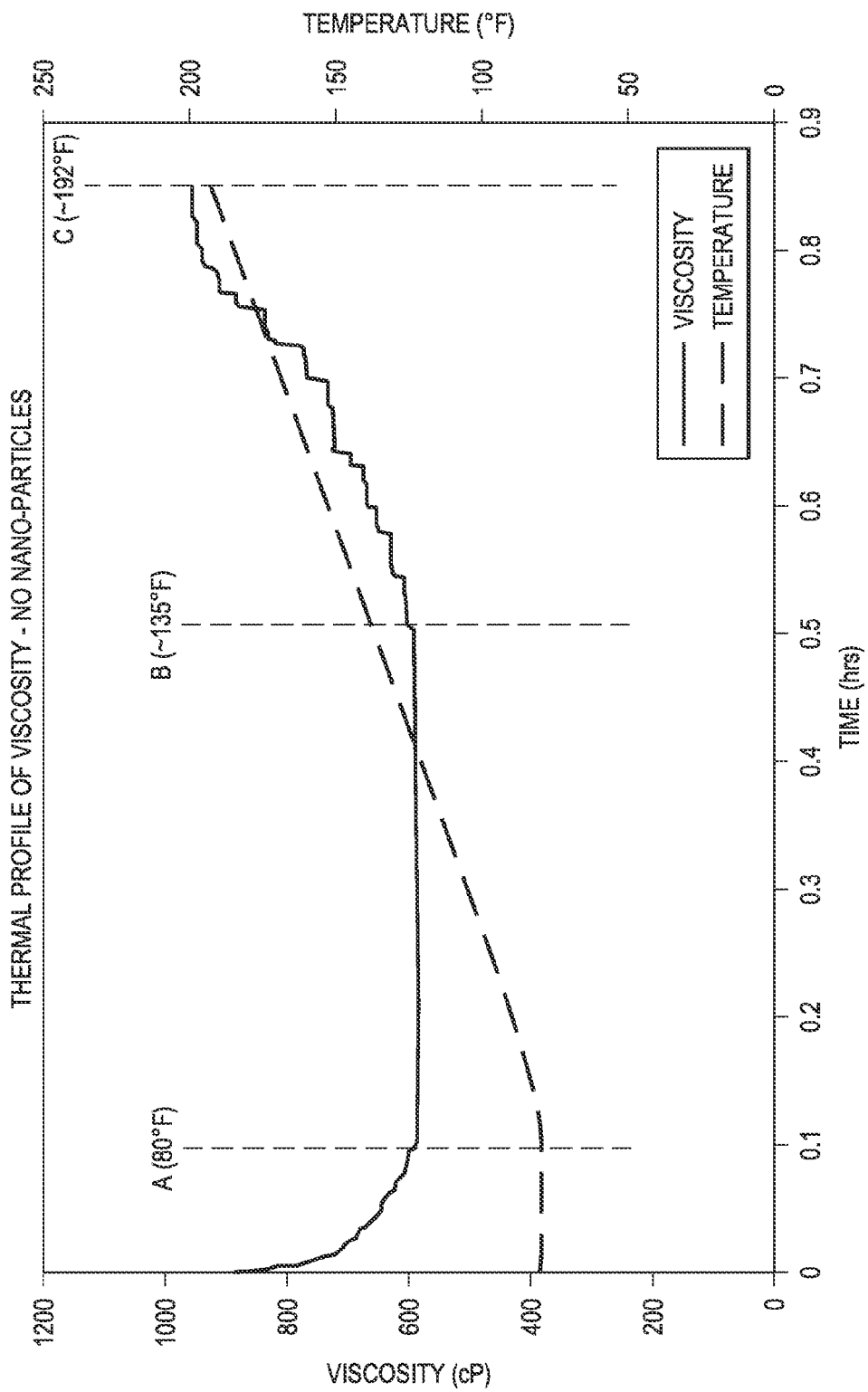
FIG. 16 is viscosity data for a spacer containing a clay/cellulose additive as a suspending aid alone (FIG. 16A) or in addition to nano-sized silica particles (FIGS. 16 B-G.)

In FIG. 16A, results for the control spacer with no nano-sized silica particles are provided. At point A, 80° F., shear thinning was complete. At point B, 135° F., viscosity build up began. The viscosity at point B was 587 cP. At point C, 192° F., the viscosity had increased to 960 cP, a roughly 84% increase from 80° F.

Figure 16B:
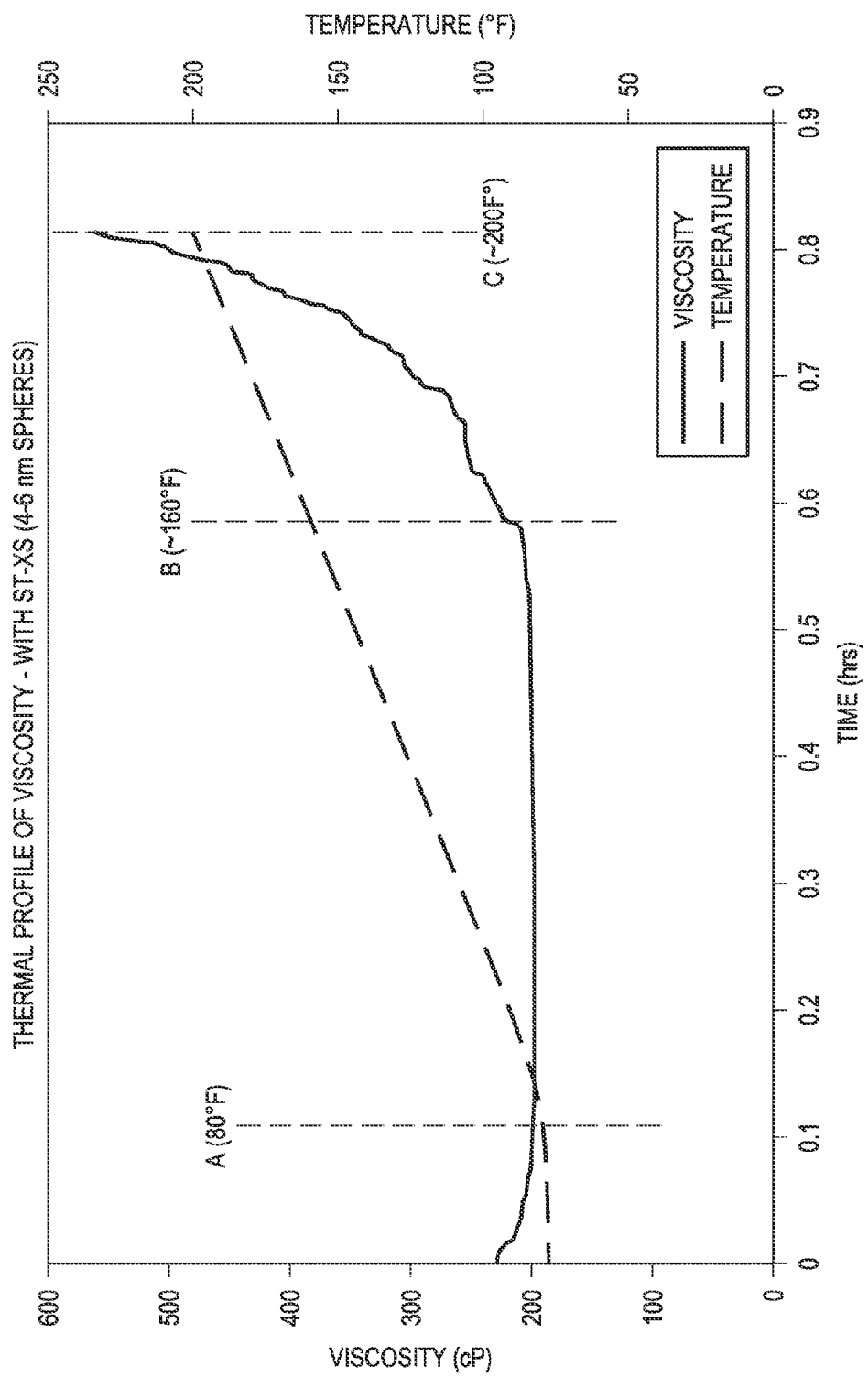

In FIG. 16B, results for the spacer with 10 g ST-XS nano-sized silica particles are provided. At point A, 80° F., shear thinning was complete. At point B, 160° F., viscosity build up began. The viscosity at point B was 220 cP. At point C, 200° F., the viscosity had increased to 550 cP, a roughly 150% increase from 80° F.

Figure 16C:
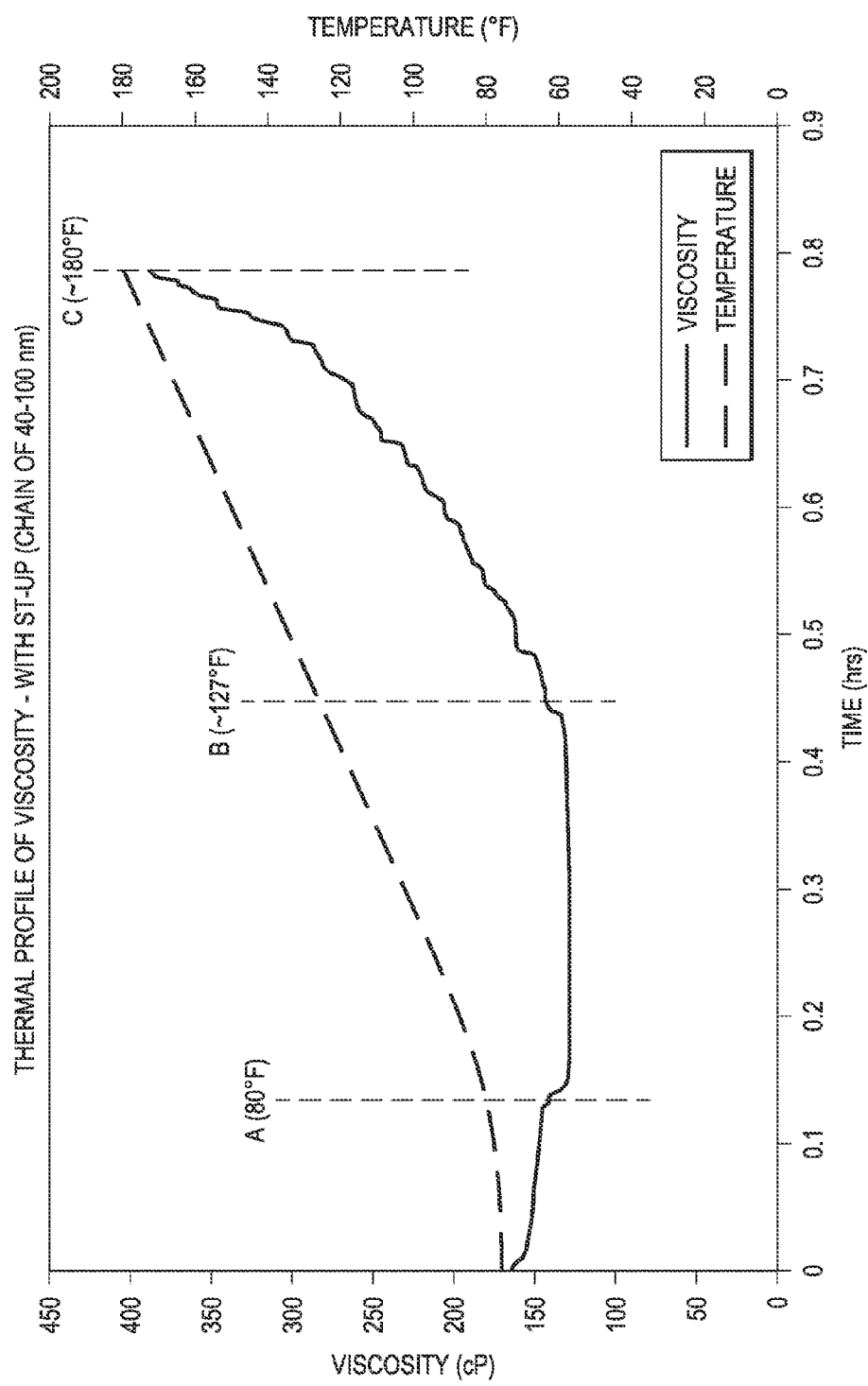

In FIG. 16C, results for the spacer with 20 g ST-UP nano-sized silica particles are provided. At point A, 80° F., shear thinning was complete. At point B, 127° F., viscosity build up began. The viscosity at point B was 142 cP. At point C, 180° F., the viscosity had increased to 390 cP, a roughly 175% increase from 80° F.

Figure 16D:
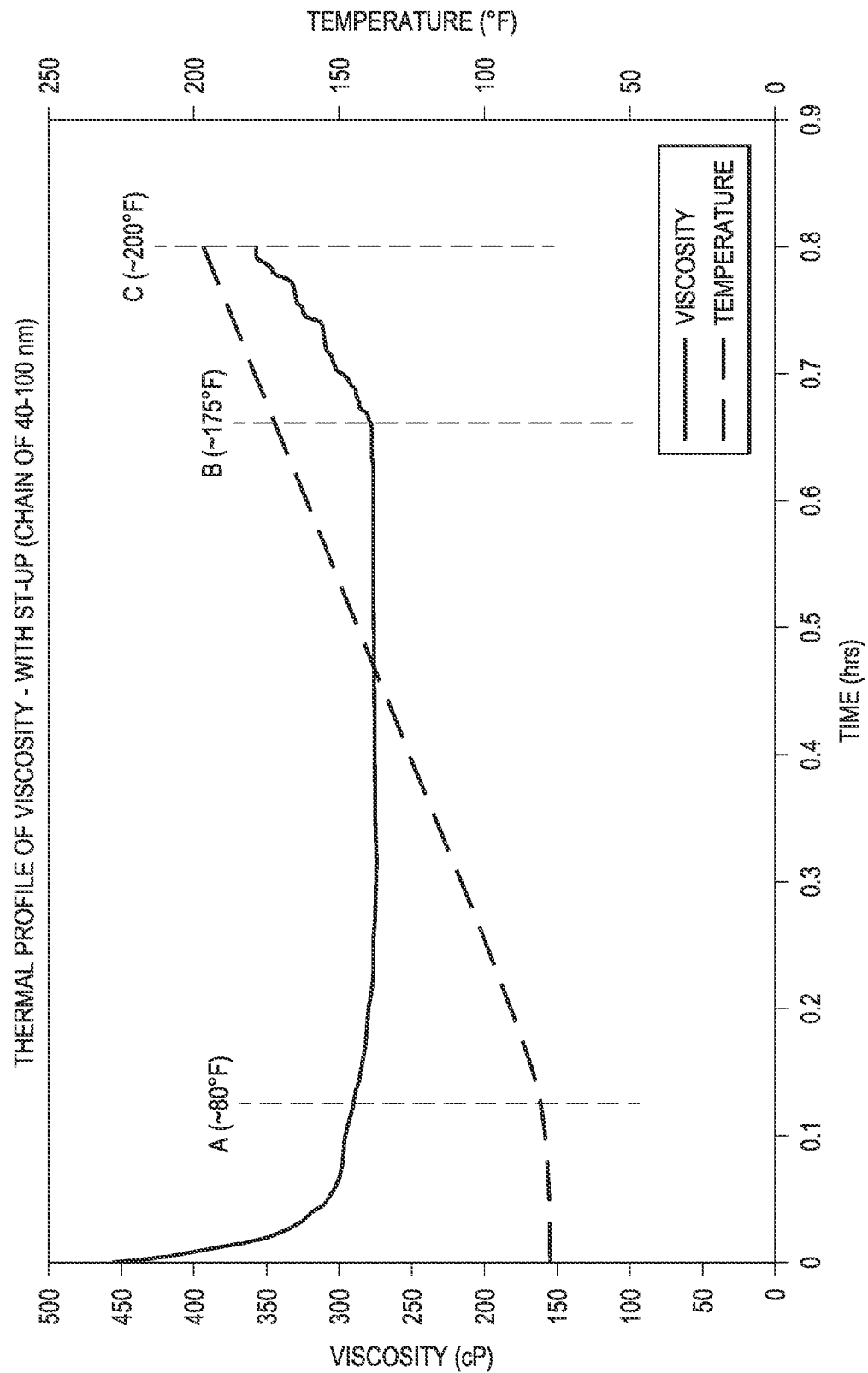

In FIG. 16D, results for the spacer with 10 g ST-UP nano-sized silica particles are provided. At point A, 80° F., shear thinning was complete. At point B, 175° F., viscosity build up began. The viscosity at point B was 280 cP. At point C, 180° F., the viscosity had increased to 350 cP, a roughly 25% increase from 80° F.

Figure 16E:
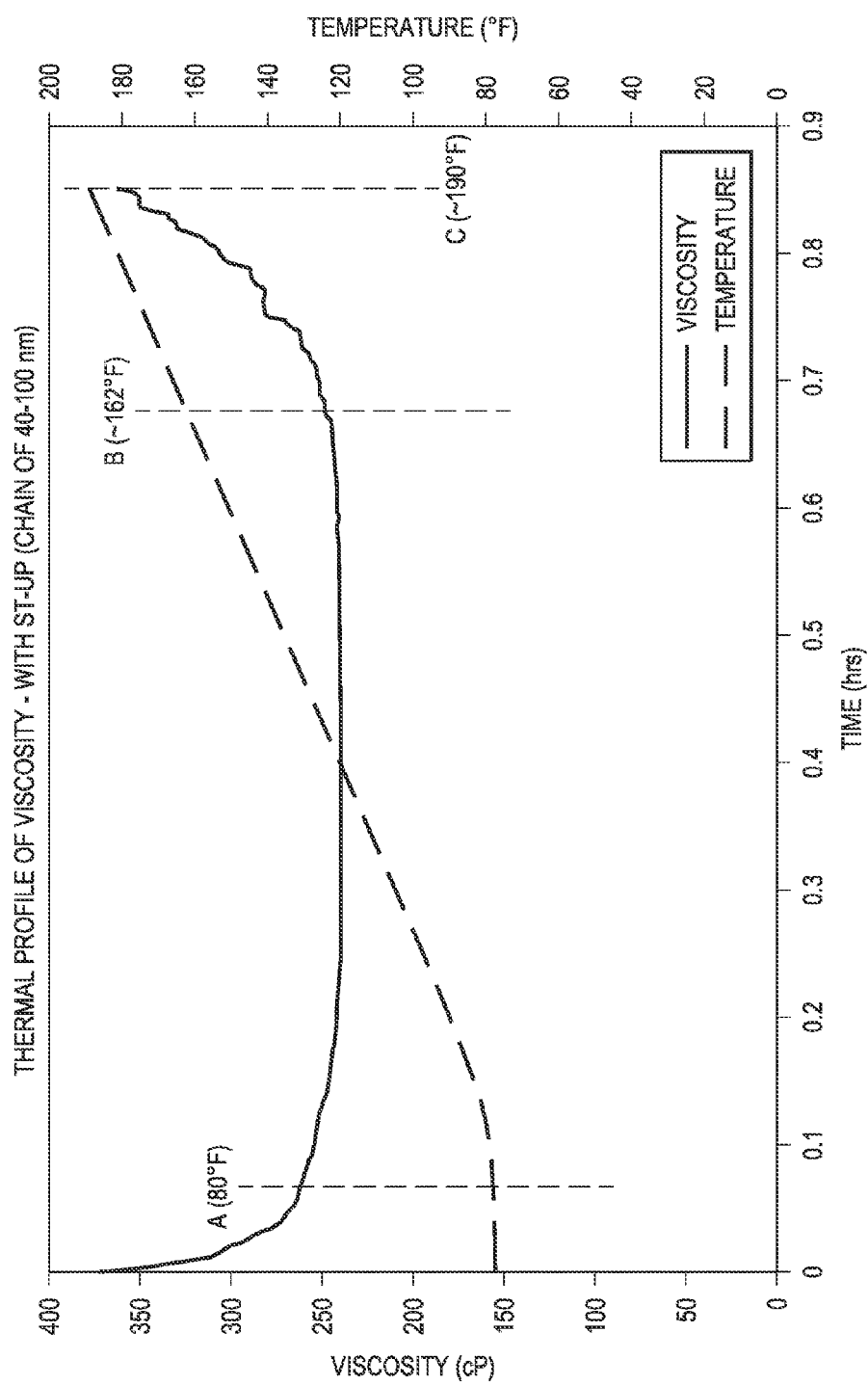

In FIG. 16E, results for the spacer with 5 g ST-UP nano-sized silica particles are provided. At point A, 80° F., shear thinning was complete. At point B, 162° F., viscosity build up began. The viscosity at point B was 250 cP. At point C, 190° F., the viscosity had increased to 350 cP, a roughly 44% increase from 80° F. In this case, with a reduced concentration of the ST-UP nano-sized silica particles, the viscosity stability was reduced a bit from the previous case (FIG. 16D) of double the concentration of the ST-UP nano-sized silica particles.

Figure 16F:
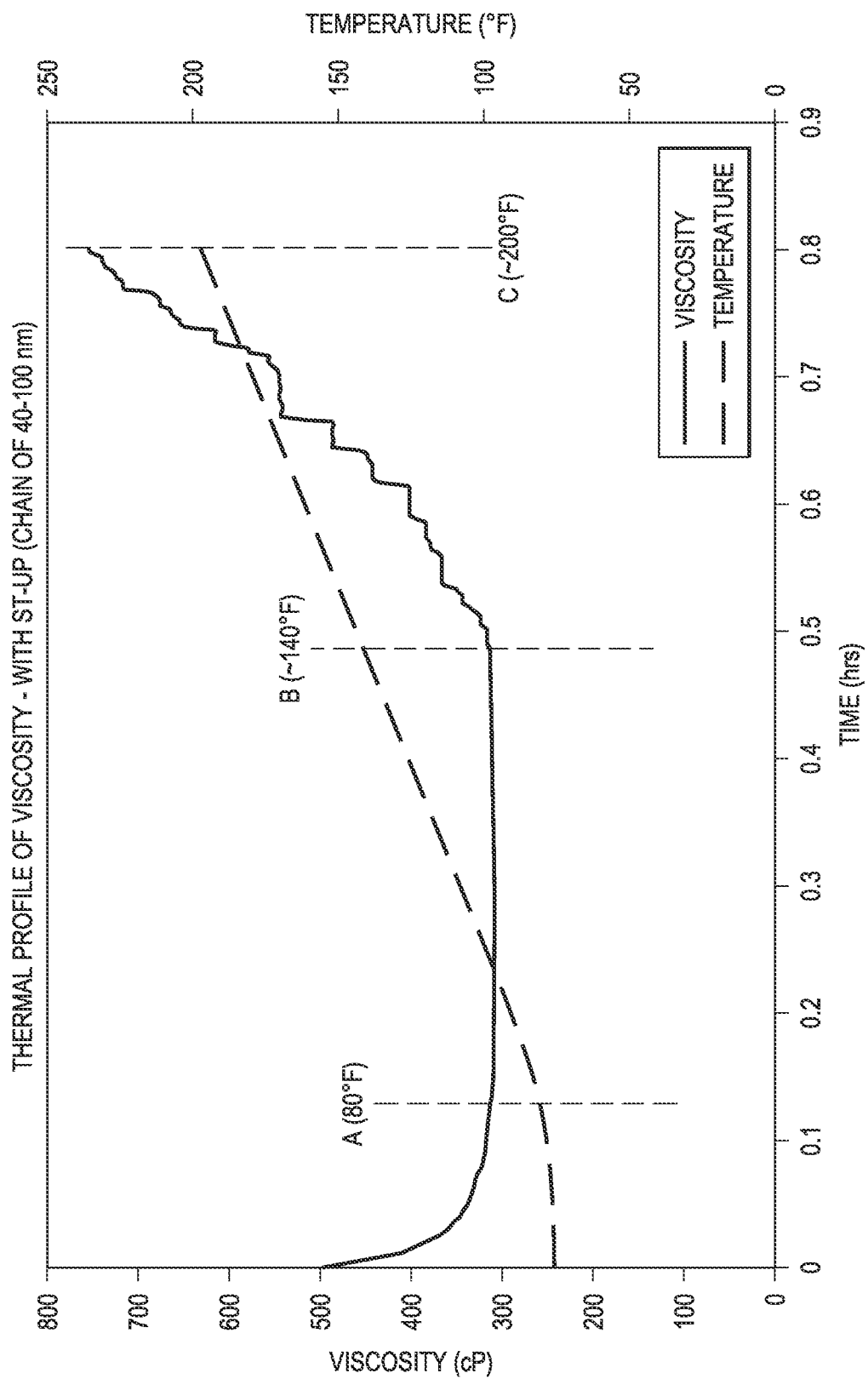

In FIG. 16F, results for the spacer with 1 g ST-UP nano-sized silica particles are provided. At point A, 80° F., shear thinning was complete. At point B, 140° F., viscosity build up began. The viscosity at point B was 320 cP. At point C, 200° F., the viscosity had increased to 750 cP, a roughly 134% increase from 80° F. In this case, with a reduced concentration of the ST-UP nano-sized silica particles, the viscosity stability from addition of the ST-UP nano-sized silica particles was lost nearly completely. The thermal behavior of the viscosity returned nearly back to the control case shown in FIG. 16A, with the only exception that the viscosity at the high temperature of ~200° F. was slightly more (an increase of ~134%) than the control case (an increase of ~64%) (however the surface viscosities would also be needed to be factored in).

Figure 16G:
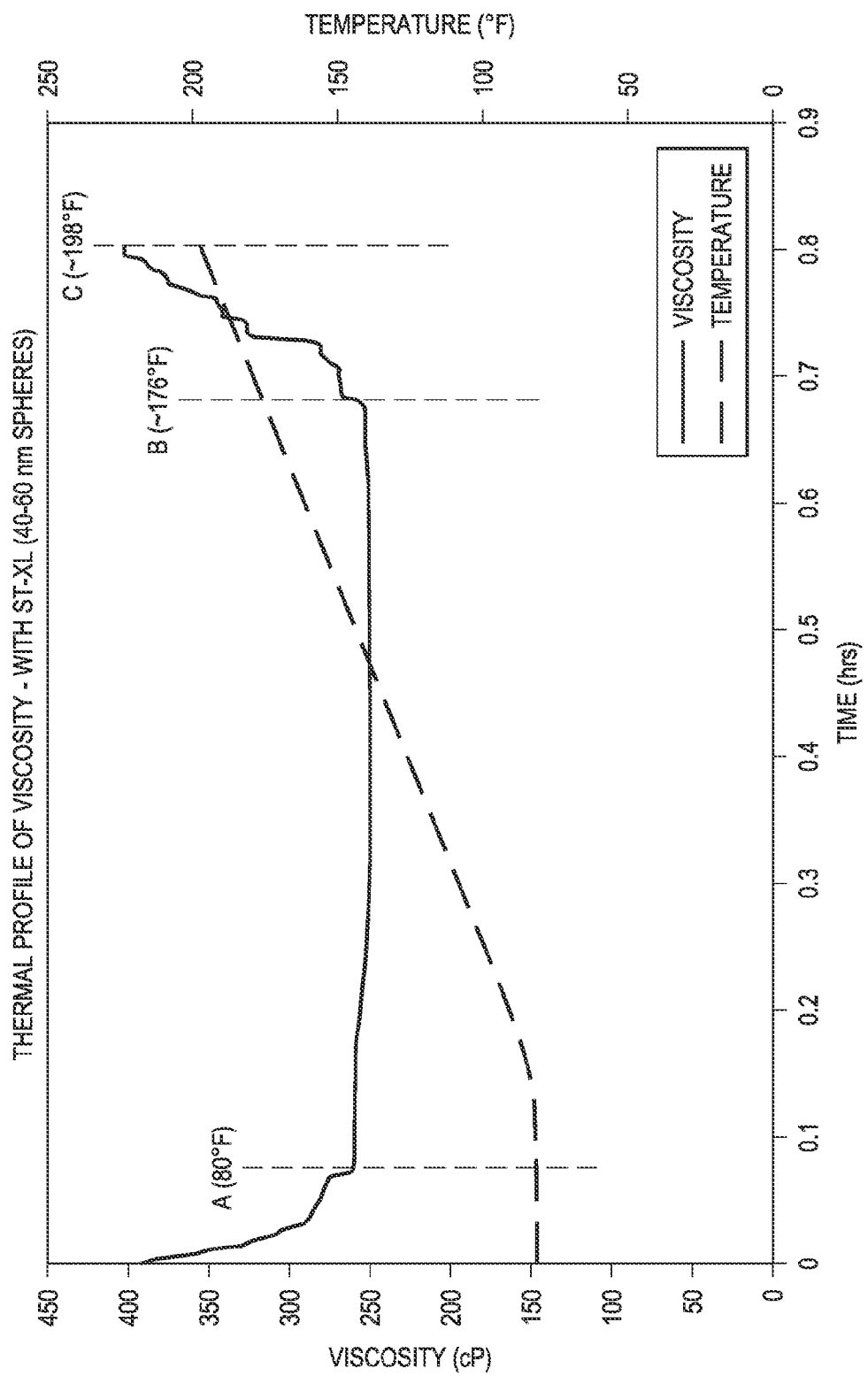

In FIG. 16G, results for the spacer with 10 g ST-XL nano-sized silica particles are provided. At point A, 80° F., shear thinning was complete. At point B, 176° F., viscosity build up began. The viscosity at point B was 255 cP. At point C, 198° F., the viscosity had increased to 400 cP, a roughly 57% increase from 80° F.

In an embodiment A, the disclosure provides: a downhole fluid including a clay, a hydroxylated polymer, and a cation, together in an amount sufficient to render the downhole fluid thermally stable at a temperature. The downhole fluid additionally includes at least one additional downhole fluid component.

In an embodiment B, which may be combined with elements of embodiment A, the disclosure provides a downhole fluid that is a drilling fluid including a clay, a hydroxylated polymer, and a cation, together in an amount sufficient to render the downhole fluid thermally stable at a temperature, and an aqueous drilling fluid base.

In an embodiment C, the disclosure provides a method of drilling a wellbore by rotating a drill string and attached drill bit to form a wellbore in a formation and pumping a drilling fluid of embodiment B through the drill string, drill bit, and wellbore.

In an embodiment D, the disclosure provides a drilling assembly including a drilling platform that supports a drill string that rotates a drill bit in a wellbore, and a drilling fluid of embodiment B that is circulated through the drill string, drill bit, and wellbore.

In an embodiment E, the disclosure provides a downhole fluid that is a spacer including a clay, a hydroxylated polymer, and a cation, together in an amount sufficient to render the downhole fluid thermally stable at a temperature, and an aqueous spacer base.

In embodiment F, the disclosure provides a method of flushing drilling fluid from a subterranean formation by pumping an amount of spacer of embodiment E into a wellbore in a subterranean formation, the wellbore containing a drilling fluid, wherein the amount of spacer is sufficient to displace from the wellbore an amount of drilling fluid sufficient to allow cementing of the wellbore.

In an embodiment G, the disclosure provides a system for flushing a drilling fluid from a subterranean formation, the system including a spacer of embodiment E and a pump able to pump the spacer into a wellbore in a subterranean formation in an amount sufficient to displace a drilling fluid from the wellbore.

In embodiment H, the disclosure provides a downhole fluid that is a cement including a clay, a hydroxylated polymer, and a cation, together in an amount sufficient to render the downhole fluid thermally stable at a temperature, and cement base.

In an embodiment I, the disclosure provides a method of cementing a wellbore by pumping an amount of cement according to embodiment H into a wellbore containing a casing to bond to the wellbore and the casing and substantially fill an annulus between the wellbore and the casing.

In an embodiment J, the disclosure provides a system for cementing a wellbore, the system including a cement of embodiment H and a pump able to pump the cement into a wellbore in a subterranean formation in an amount sufficient to fill and annulus between a casing in the wellbore and the wellbore and to bond to both the casing and the wellbore.

In embodiment K, the disclosure provides a downhole fluid that is a proppant delivery fluid including a clay, a hydroxylated polymer, and a cation, together in an amount sufficient to render the downhole fluid thermally stable at a temperature, and an aqueous proppant delivery fluid base.

In an embodiment L, the disclosure provides a method of stimulating a well by pumping an amount sufficient to cause well stimulation of proppant delivery fluid of embodiment K and a proppant into a wellbore in a subterranean formation.

In an embodiment M, the disclosure provides a system for stimulating a well, the system including: a proppant delivery fluid of embodiment K, a proppant, a pump able to pump the proppant delivery fluid into a wellbore in a subterranean formation in an amount sufficient to for the proppant to cause well stimulation.

In an embodiment N, the disclosure provides a method of treating a subterranean formation by placing a downhole fluid of embodiment A in a subterranean formation.

Embodiments A-N may be combined with any of the following additional elements, which may also be combined with one another unless clearly incompatible: i) the downhole fluid includes an aqueous component with a pH of at least 9; ii) the clay includes a phyllosilicate clay; iii) the phyllosilicate clay includes a smectite clay; iv) the smectite clay includes a hectorite clay; v) the phyllosilicate clay includes a sepiolite clay; vi) the phyllosilicate clay includes a palygorskite clay; vii) the hydroxylated polymer includes cellulose; viii) the cellulose includes microcellulose or nanocellulose; ix) the downhole fluid includes or is formed from salt water; x) the downhole fluid has a transition temperature at which viscosity rapidly increases of around 150° F.; xi) the downhole fluid includes a particle additive; xii) the clay, hydroxylated polymer, and cation are a suspension aid for the particle additive; xiii) the downhole fluid includes nanoparticles of 100 nm or less in size; xiv) the amount of clay and hydroxylated polymer is less than 10% by weight of water of the downhole fluid; xv) the amount of clay and hydroxylated polymer is between 1% and 3% by weight of water of the downhole fluid; xvi) the downhole fluid remains stable in the presence of salt water; xvii) the downhole fluid is thermally stable at a temperature of 200° F. or higher for at least twelve hours; xviii) the fluid includes hydrodynamic spheres formed by a downhole fluid component and hydrodynamic spheres formed from nano-sized silica particles in an amount sufficient to inhibit interactions between the hydrodynamic spheres formed form at least one downhole fluid component; xvix) the hydrodynamic spheres formed from nano-sized silica particles are present in an amount sufficient to delay the development of viscosity of the downhole fluid as temperature increases; xx) the hydrodynamic spheres formed from nano-sized silica particles are present in an amount sufficient to extend the viscosity stability of the downhole fluid to higher temperatures; xxi) wherein the nano-sized silica particles are 100 nm in or less in size; xxii) the nano-sized silica particles are present in an amount of between half the amount of hydroxylated polymer by weight and double the amount of hydroxylated polymer by weight.

Embodiments B-D and N may be combined with any of the following additional elements, which may also be combined with one another unless clearly incompatible: i) the drilling fluid also includes a bridging material, a lost circulation prevention material, a rheology modifier, a fluid loss prevention agent, a corrosion inhibitor, a defoamer, a shale stabilizer, a lubricant, or any combinations thereof; ii) the aqueous base is between 20% and 99.99% by volume of the drilling fluid.

Embodiments E-G and N may be combined with any of the following additional elements, which may also be combined with one another unless clearly incompatible: i) the spacer also includes a surfactant, defoamer, visosifying agent, or any combinations thereof.

Embodiments H-J and N may be combined with any of the following additional elements, which may also be combined with one another unless clearly incompatible: i) the cement also includes a set retarder, friction-reducer, strength-retrogression additive, set accelerator, weighting agent, lightweight additive, gas-generating additive, mechanical property enhancing additive, lost-circulation material, filtration-control additive, dispersants, fluid loss control additive, defoaming agent, foaming agent, thixotropic additive, or any combinations thereof; ii) the clay, hydroxylated polymer, and cation together are a fluid loss preventer; iii) the clay, hydroxylated polymer, and cation together are a gas migration control additive; iv) the clay, hydroxylated polymer, and cation together are a suspending aid.

Embodiments K-N may be combined with any of the following additional elements, which may also be combined with one another unless clearly incompatible: i) the proppant delivery fluid includes a proppant; ii) the proppant includes sand; iii) the proppant has an average particle size in the range of from about 2 to about 400 mesh; iv) the proppant is present in an amount of from about 0.1 pounds per gallon (ppg) to about 28 ppg, based on the volume of the proppant delivery fluid.

Embodiment N may be combined with any of the following additional elements, which may also be combined with one another unless clearly incompatible: i) placing the downhole fluid in the subterranean formation may include pumping the downhole fluid into the subterranean formation using a pump; ii) the method may also include mixing the downhole fluid with mixing equipment prior to placing it in the subterranean formation; iii) the method may also include removing the downhole fluid or a portion thereof from the subterranean formation by displacement with additional downhole fluid or a second downhole fluid; iv) the method may also include allowing the downhole fluid or a portion thereof to remain in the subterranean formation; v) a system operable to perform any of the method steps may be used.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. For example, additional fluids may be used and data acquired with respect to one fluid or descriptions of downhole fluid additive effects with respect to one fluid may be applicable to other fluids. In particular, using the teachings of this disclosure, one of ordinary skill in the art may create a database of stoichiometric combinations of the ingredients for any fluid through a testing matrix to allow selection of components for a desired density and viscosity or other properties.

Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A downhole fluid comprising:
   a smectite clay;
   a hydroxylated polymer;
   a cation;
   the smectite clay, the hydroxylated polymer and the cation together in an amount sufficient to render the downhole fluid thermally thixotropic at a temperature of 400° F.; and
   at least one additional downhole fluid component that is an aqueous component with a pH of at least 9, a density control additive, or a viscosity control material.

2. The downhole fluid of claim 1, further comprising salt water as a further additional component to all the components described.

3. The downhole fluid of claim 1, wherein the downhole fluid has a transition temperature of around 150° F. at which viscosity rapidly increases.

4. The downhole fluid of claim 1, wherein the downhole fluid comprises a density control additive, and wherein the clay, hydroxylated polymer, and cation are a suspension aid for the density control additive.

5. The downhole fluid of claim 1, wherein the viscosity control material comprises nanoparticles of 100 nm or less in size.

6. The downhole fluid of claim 1, wherein the downhole fluid is a drilling fluid and further comprises a bridging material, a lost circulation prevention material, a rheology modifier, a fluid loss prevention agent, a corrosion inhibitor, a defoamer, a shale stabilizer, a lubricant, or any combinations thereof.

7. The downhole fluid of claim 1, wherein the downhole fluid is a spacer and further comprises a surfactant, defoamer, visosifying agent, or any combinations thereof.

8. The downhole fluid of claim 1, wherein the downhole fluid is a cement and further comprises a cement base.

9. The downhole fluid of claim 8, further comprising a set retarder, friction-reducer, strength-retrogression additive, set accelerator, weighting agent, lightweight additive, gas-generating additive, mechanical property enhancing additive, lost-circulation material, filtration-control additive, dispersants, fluid loss control additive, defoaming agent, foaming agent, thixotropic additive, or any combinations thereof.

10. The downhole fluid of claim 8, wherein the clay, hydroxylated polymer, and cation together are a fluid loss preventer.

11. The downhole fluid of claim 8, wherein the clay, hydroxylated polymer, and cation together are a gas migration control additive.

12. The downhole fluid of claim 1, wherein the downhole fluid is a proppant delivery fluid and further comprises a proppant.

13. The downhole fluid of claim 12, wherein the proppant comprises sand.

14. The downhole fluid of claim 12, wherein the proppant has an average particle size in the range of from about 2 to about 400 mesh.

15. The downhole fluid of claim 1, wherein the hydroxylated polymer comprises microcellulose or nanocellulose.

* * * * *